(12) United States Patent
Takizawa

(10) Patent No.: US 7,916,468 B2
(45) Date of Patent: Mar. 29, 2011

(54) STAND AND ELECTRONIC DEVICE SYSTEM

(75) Inventor: Tomohiro Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/585,295

(22) Filed: Sep. 10, 2009

(65) Prior Publication Data

US 2010/0001163 A1    Jan. 7, 2010

Related U.S. Application Data

(63) Continuation of application No. PCT/JP2007/055386, filed on Mar. 16, 2007.

(51) Int. Cl.
*G06F 1/16* (2006.01)
*G06F 13/00* (2006.01)

(52) U.S. Cl. ......... 361/679.44; 361/679.41; 361/679.45; 710/303; 710/304

(58) Field of Classification Search .......... 361/679.01–679.45, 679.55–679.59; 710/303, 304
See application file for complete search history.

(56) References Cited

U.S. PATENT DOCUMENTS

| | | | |
|---|---|---|---|
| 5,633,782 A * | 5/1997 | Goodman et al. ....... | 361/679.41 |
| 6,256,193 B1 * | 7/2001 | Janik et al. ............... | 361/679.59 |
| 6,700,775 B1 * | 3/2004 | Chuang et al. ........... | 361/679.01 |
| 7,255,317 B2 | 8/2007 | Huang et al. | |
| 7,327,560 B1 * | 2/2008 | Tabasso et al. .......... | 361/679.09 |
| 2005/0139740 A1 * | 6/2005 | Chen et al. ..................... | 248/371 |
| 2006/0043253 A1 | 3/2006 | Huang et al. | |
| 2007/0221811 A1 * | 9/2007 | Hauser et al. ................. | 248/454 |

FOREIGN PATENT DOCUMENTS

| | | |
|---|---|---|
| JP | 6-37915 | 5/1994 |
| JP | 6-232567 | 8/1994 |
| JP | 3064629 | 9/1999 |
| JP | 2000-214984 | 8/2000 |
| JP | 2005-196724 | 7/2005 |
| JP | 2006-72958 | 3/2006 |

OTHER PUBLICATIONS

International Search Report for PCT/JP2007/055386, mailed May 29, 2007.
English Translation of the International Preliminarily Report on Patentability mailed Oct. 8, 2009 in corresponding International Patent Application PCT/JP2007/055386.
Japanese Office Action issued Sep. 28, 2010 in corresponding Japanese Patent Application 2009-508740.

* cited by examiner

*Primary Examiner* — Jayprakash N Gandhi
*Assistant Examiner* — Nidhi Desai
(74) *Attorney, Agent, or Firm* — Staas & Halsey LLP

(57) ABSTRACT

A back support board is pivotable between a flat state and a standing state. A support interposition board lies flat together with the back support board and a base board when the back support board 420 is in the flat state. A front support board is pivotable between a flat state and a standing state.

8 Claims, 33 Drawing Sheets

STAND AND ELECTRONIC DEVICE SYSTEM

CROSS-REFERENCE TO RELATED APPLICATION

This is a continuation application of PCT/JP2007/55386, filed on Mar. 16, 2007.

TECHNICAL FIELD

The present invention relates to a stand in which an electronic device having a display screen in the front is leaned, and an electronic device system having such electronic device and stand.

BACKGROUND ART

In recent years, as an electronic device that has a display screen, there has been developed and commercialized an electronic device that has a wide display screen on the front surface of an enclosure and is shaped like a board in its entirety having no keyboard. In this type of electronic device, an instruction is input in such a way that a pen is brought into contact with or near the display screen so that the position of the pen is recognized. As such an electronic device, for instance, there are known a palmtop type with limited processing performance and a tablet type with processing performance similar to that of a personal computer (the tablet type is abbreviated with tablet PC hereinafter).

Such an electronic device has a shape and functions suitable for portability, and is expected to be used and carried outdoors. Especially, the tablet PC, which has the processing performance similar to that of the personal computer as mentioned above, is expected to be used for work on a desk when brought back to home from outside.

In use of such an electronic device on the desk, when the electronic device is put on a horizontal desk, the display screen that is the input side will be substantially horizontal as well. However, some operator may want to perform input operation with a pen on the display screen made stand at an easy-to-see angle.

In use of such an electronic device on the desk, it is preferable to connect external equipment such as a keyboard and a mouse with the electronic device in order to carry out work smoothly. In the event that the instruction is input by using the keyboard and the mouse without using the pen, it is more convenient to make the display screen stand at an easy-to-see angle.

As means for making the display screen stand at an easy-to-see angle, there is proposed a stand for maintaining an electronic device in a leaning posture (refer to Patent document 1: Japanese Laid-open Patent Publication No 06-232567, for instance). The stand proposed by Japanese Patent document 1 has a maintenance section for maintaining the electronic device in a leaning posture is provided with a support section that detachably supports an enhancement unit that enhances the function of the electronic device. Moreover, the maintenance section is coupled to a base placed on the installation face of the stand, while being pivotable back and forth. To the maintenance section, a leg for maintaining a standing posture is pivotably coupled. Therefore, the stand can be folded by turning the leg and the maintenance section.

DISCLOSURE OF INVENTION

According to the stand proposed by Japanese Patent document 1, a necessary installation space on the installation face can be small even in a case where the enhancement unit is connected with the electronic device, because the enhancement unit can be supported by using the support section installed in the maintenance section. However, the stand proposed by the Japanese Patent document 1 becomes bulky when the stand is folded, since the support section is installed in the maintenance section. Therefore, the stand is poor in portability when used in such a manner that the stand is folded while being carried together with the electronic device to a destination, and opened inside and outside the destination as required to support the electronic device in a leaning posture.

In view of the foregoing, it is an object of the present invention to provide a stand that is excellent in the portability, and an electronic device system having an electronic device and such a stand.

In view of the foregoing, it is an object of the present invention to provide a stand that is excellent in the portability.

A stand of the present invention achieving the above object is a stand against which an electronic device having a front face with a display screen disposed thereon is leaned, the stand including:

a base board to be laid;

a back support board having a former edge that is pivotably supported on the base board around a turning shaft extending right and left at a position that goes from the former edge of the base board backward, the back support board being pivotable between a flat state in which the back support board lies flat on the base board and at least one of standing states in which the back support board stands diagonally on the base board, and supporting a back of the electronic device in the standing state;

a support interposition board that is pivotably supported on one of the back support board and the base board, and lies flat together with the back support board and the base board when the back support board is in the flat state, the support interposition board being pivotable when the back support board is in the standing states, so that the support interposition board is interposed between the back support board and the base board and allows the back support board to be supported on the base board in the standing states; and a front support board that is arranged between the former edge of the base board and a former edge of the back support board, the front support board being pivotable between a flat state in which the former edge of the front support board is pivotably supported by the base board along the former edge of the base board, and the front support board lies flat on the base board, and a standing state in which the front support board stands at a prescribed angle on the base board and a rear end edge of the front support board abuts and supports a lower front part of the electronic device whose back is supported by the back support board in the standing state.

According to the stand of the present invention, the back support board is pivotable between the flat state and the standing state, the support interposition board lies flat together with the back support board and the base board when the back support board is in the flat state, and the front support board is pivotable between the flat state and the standing state. Therefore, according to the stand of the present invention, the components of the stand may be laid on the base board like a flat plate when the stand is folded, and thus bulkiness is suppressed and it is excellent in portability.

Here, it is preferable that in the stand according to the present invention, "as for the support interposition board, the former edge of the support interposition board is pivotably supported on the back support board when the back support board is in the flat state, and as for the support interposition board, when the back support board is in a standing state, the support interposition board makes a rear end edge of the support interposition board abut the base board, and the base board has two or more support parts each supporting the rear end edge of the support interposition board and disposed in a front and back direction."

According to the preferable feature as described above, any of the support parts is selected from among the support parts to support the rear end edge of the support interposition board. This feature makes it possible to realize support at a desired standing angle by adjusting the standing angle of the back support board.

It is further preferable that, in the stand according to the present invention, the base board has convexo-concave shapes extended in a right and left direction and repeated in a front and back direction, and accepts a rear end edge of the support interposition board in a concave part of the convexo-concave shapes.

According to the preferable feature as described above, any of the concave parts in the convexo-concave shapes is selected to come in contact with the rear end edge of the support interposition board. This feature makes it possible to realize support at a desired standing angle by adjusting the standing angle of the back support board.

Also, the stand according to the present invention preferably has a geometry that allows both the back support board and the support interposition board to directly lie flat on the base board, while avoiding overlapping the back support board and the support interposition board with each other.

According to the preferable feature as described above, bulkiness is suppressed when the stand is folded, and the stand can be made more compact to be carried.

Furthermore, it is also preferable that in the stand according to the present invention, the back support board has an aperture, and the support interposition board has a geometry that enables the support interposition board in the flat state to fit in the aperture.

According to the preferable feature as described above, bulkiness is suppressed when the stand is folded, and the stand can be made more compact to be carried.

Furthermore, it is also preferable that in the stand according to the present invention, "the display screen disposed on the front face of the electronic device has a pen input function of detecting contact or approach of a pen, and the electronic device, which is provided with the display screen having the pen input function, is leant against the stand."

According to the preferable feature as described above, the display screen is stood at an easy-to-see angle, enabling the input operation with the pen, which is convenient.

It is also preferable that in the stand according to the present invention, the stand is fixed under a keyboard having a front face where operation keys are arranged, the keyboard having a screw hole in a back face, with a screw using the screw hole of the keyboard, and the stand has an unloaded hole that permits the stand to be pivotable with the screw loosened between a storage state that the stand is stored under the keyboard, and a use state that the former edge of the base board remains under the keyboard and the back support board is taken out from under the keyboard.

According to the preferable feature as described above, it is possible to store the stand of the present invention under the keyboard. This feature makes it possible to suppress bulkiness even in a case where the stand is carried with the keyboard. Thus, high portability is secured. Moreover, in the use form that the electronic device is detachably maintained, and the electronic device installed in the docking station that mediates signal I/O between the electronic device and an external device is used together with the keyboard, as mentioned above, bulkiness is suppressed even if the stand of the present invention is stored under the keyboard. This feature makes it possible for the user to operate the keyboard where the stand is stored without a feeling of wrongness. The stand, which is fixed under the keyboard with a screw, has an unloaded hole that permits the stand to be pivotable with the screw loosened between the storage state and the use state. This feature makes it possible to easily take out the back support board of the stand from under the keyboard, if necessary. Thus it is convenient. Moreover, when the back support board of the stand taken out from under the keyboard is supported in the standing state so that the electronic device is leant against the stand, the rear end edge of the keyboard comes in contact with the lower portion of the front side of electronic device in the leaning state so as to support the lower portion of the front of the electronic device. This feature makes it possible to use the electronic device like a notebook type personal computer.

It is further preferable that in the stand according to the present invention, "the keyboard is a wireless keyboard in which key input information according to a key operation is wirelessly transmitted to the electronic device, and the stand is fixed with the screw under the wireless keyboard, and the stand has the unloaded hole that permits the stand to be pivotable with the screw loosened between the storage state and the use state."

According to the preferable feature as described above, the back support board of the stand is taken out from under the keyboard if necessary, and is set in the standing state, so that the electronic device is leant against the stand. This feature makes it possible to permit a key input without necessity of a cable connection of the keyboard with the electronic device. Thus it is convenient.

An electronic device system of the present invention achieving the above object is an electronic device system including:

an electronic device having a front face with a display screen disposed thereon; and a stand against which the electronic device is leaned, wherein the stand includes:

a base board to be laid, a back support board having a former edge that is pivotably supported on the base board around a turning shaft extending right and left at a position that goes from the former edge of the base board backward, the back support board being pivotable between a flat state in which the back support board lies flat on the base board and at least one of standing states in which the back support board stands diagonally on the base board, and supporting a back of the electronic device in the standing state, a support interposition board that is pivotably supported on one of the back support board and the base board, and lies flat together with the back support board and the base board when the back support board is in the flat state, the support interposition board being pivotable when the back support board is in the standing states, so that the support interposition board is interposed between the back support board and the base board and allows the back support board to be supported on the base board in the standing states, and a front support board that is arranged between the former edge of the base board and a former edge of the back support board, the front support board being pivotable between a flat state in which the former edge of the front support board is pivotably supported by the base board along the former edge of the base board, and the front support board lies flat on the base board, and a standing state in which the front support board stands at a prescribed angle on the base board and a rear end edge of the front support board abuts and supports a lower front part of the electronic device whose back is supported by the back support board in the standing state.

According to the electronic device system of the present invention, the stand is excellent in portability like the above-described stand of the present invention.

Only the basic feature of the electronic device system of the present invention is described here to avoid overlapping description, and the electronic device system of the invention includes not only the above-described basic feature but also various forms corresponding to the various forms of the stand of the present invention as described above.

According to the present invention, there are provided a stand that is excellent in portability, and an electronic device system having an electronic device and such a stand.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BEST MODE FOR CARRYING OUT THE INVENTION

Hereinafter there will be described embodiments of the present invention in conjunction with the drawings.

Here, as one example of an electronic device, there will be described a so-called tablet type personal computer having a wide display screen on a front surface (a top face in FIG. 1) of an enclosure, which is shaped as a board in its entirety having no keyboard, into which an instruction is input by brining a special pen into contact with or near the display screen so that the position of the pen is recognized (hereinafter, the tablet type personal computer is abbreviated as tablet PC).

Figure 1:
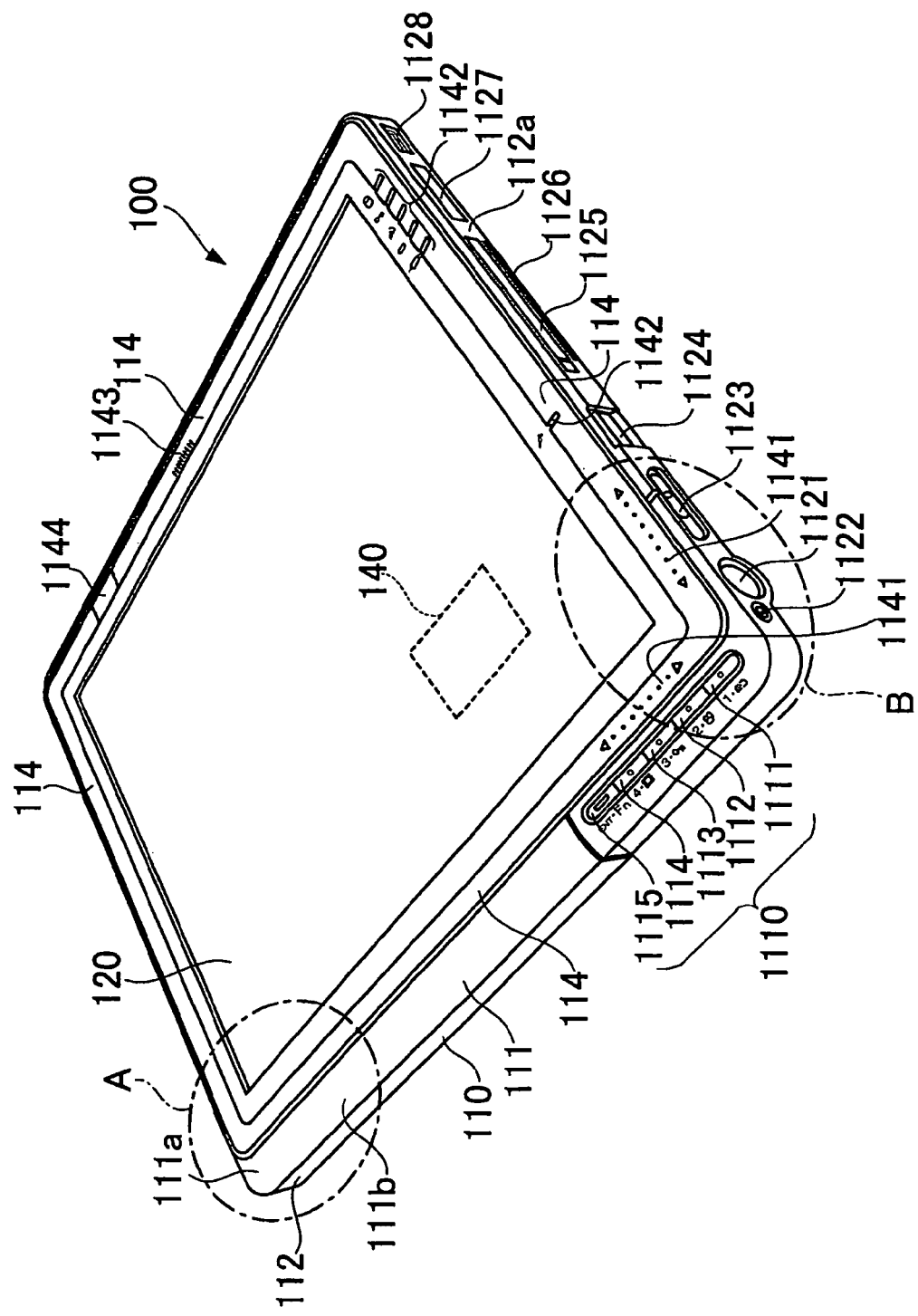
FIG. 1 is a perspective view of a tablet PC when viewed obliquely from the upper front.
Figure 2:
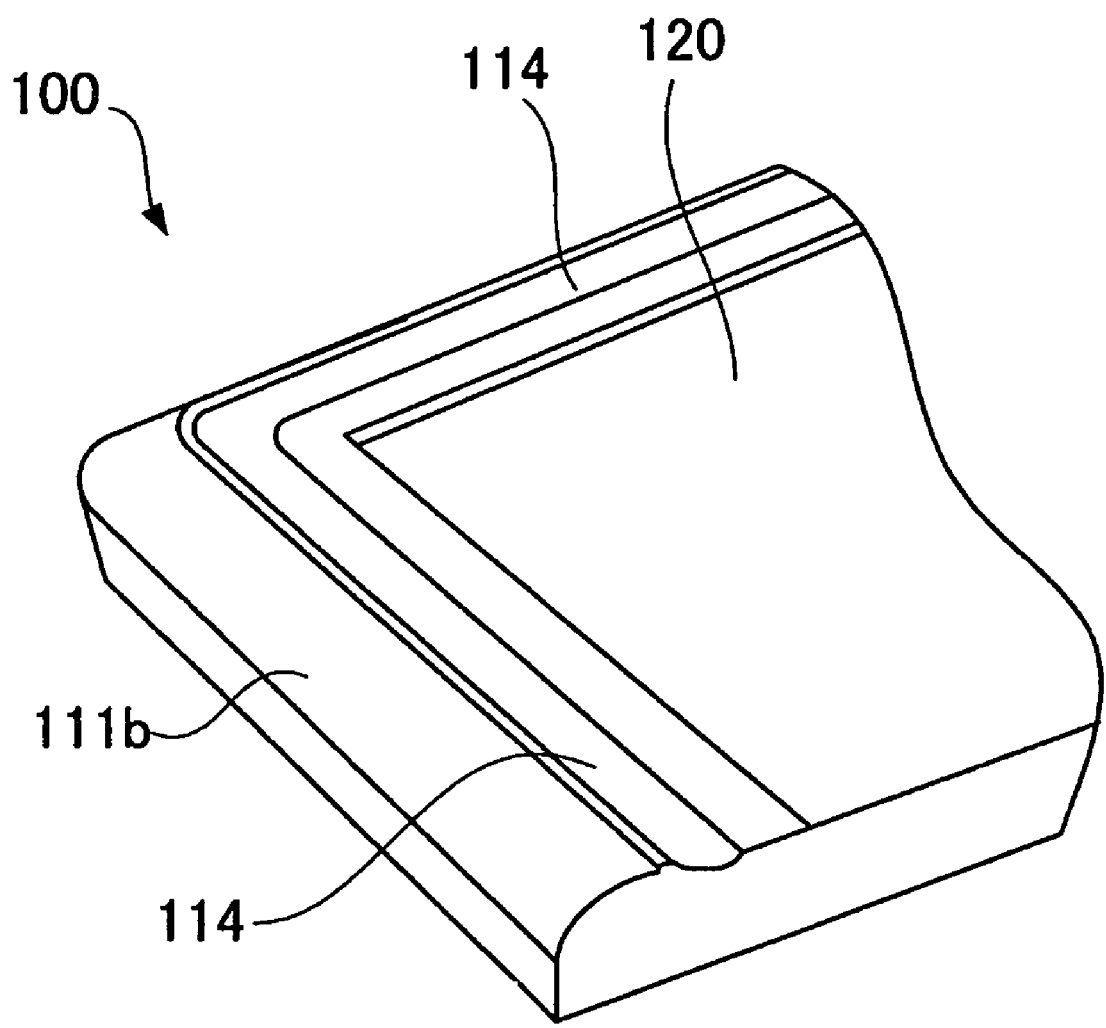
FIG. 2 is an enlarged perspective view of a part of a portion A illustrated in FIG. 1.
Figure 3:
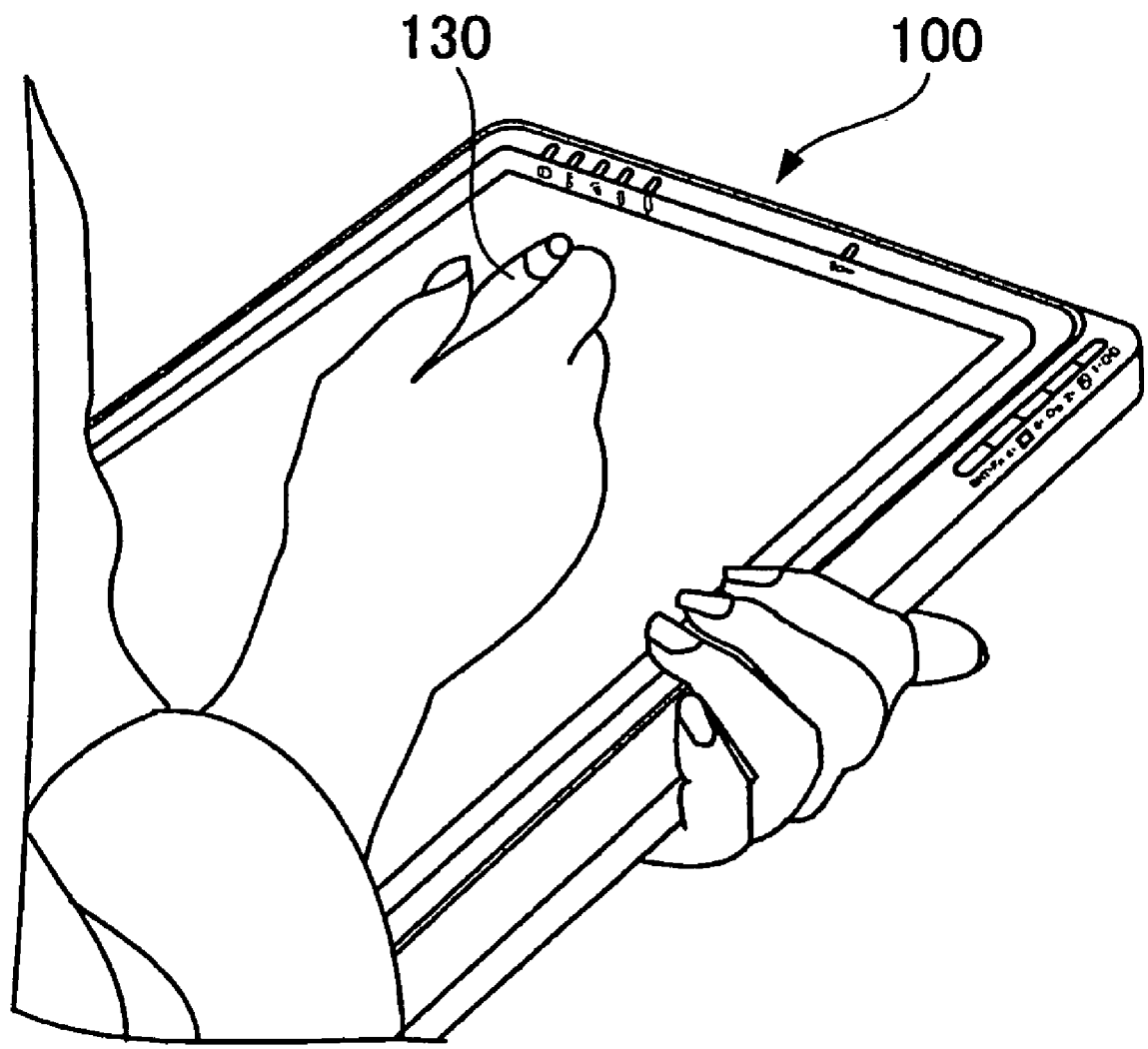
FIG. 3 is a perspective view where a state that an operator holds the tablet PC illustrated in FIG. 1 is depicted.
Figure 4:
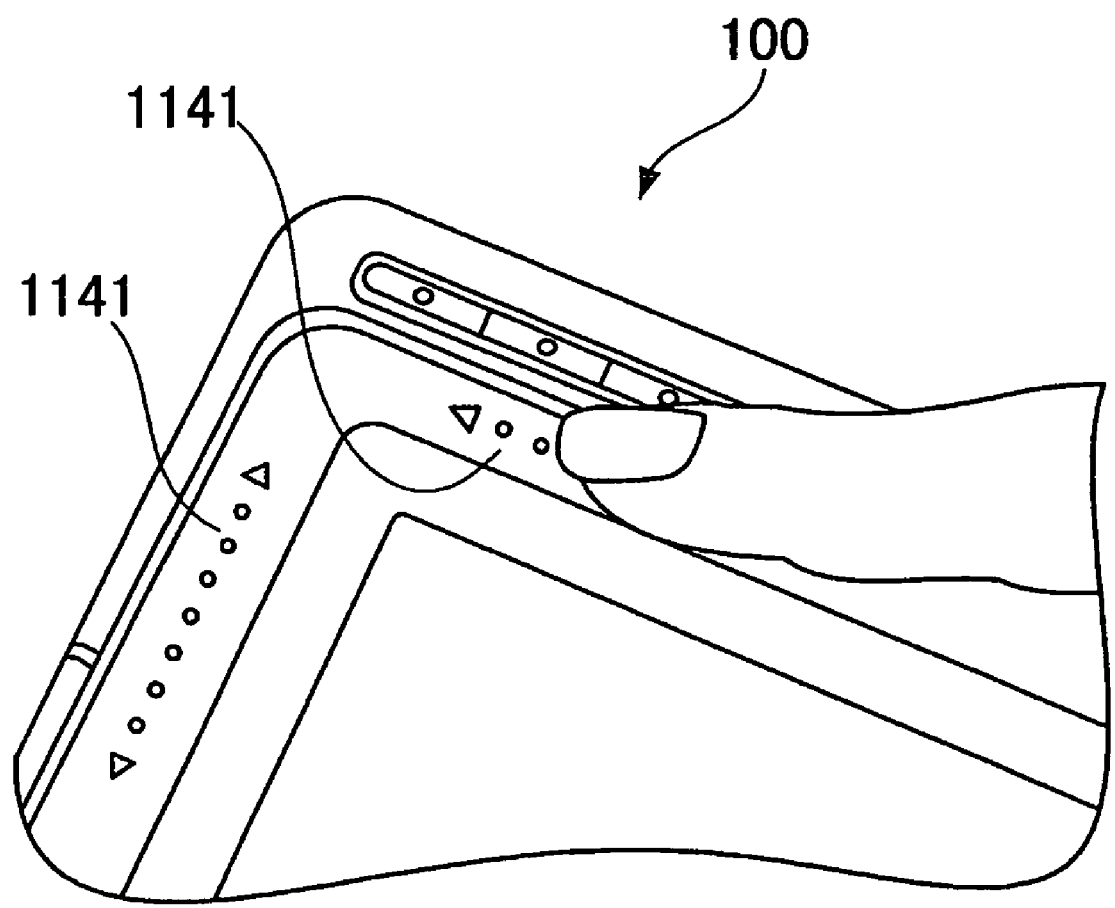
FIG. 4 is an enlarged perspective view of a part of a portion B illustrated in FIG. 1.

FIG. 1 is a perspective view of a tablet PC 100 when viewed obliquely from the upper front. FIG. 2 is an enlarged perspective view of a part of a portion A illustrated in FIG. 1. FIG. 3 is a perspective view where the state that an operator holds the tablet PC 100 illustrated in FIG. 1 is depicted. FIG. 4 is an enlarged perspective view of a part of a portion B illustrated in FIG. 1.

The tablet PC 100 illustrated in FIG. 1 possesses the processing performance similar to a general personal computer, and has a hard disk drive and a CPU (central processing unit) in the inside.

The tablet PC 100 is externally shaped as a board as illustrated in FIG. 1, and has an enclosure 110 that is made of resin, and a display screen 120 disposed in the areas except a surroundings edge area 111a that is adjacent to a side 112, of a front 111 (an upper surface of FIG. 1) of the enclosure 110. The display screen 120 has a pen input function, which is provided with an electromagnetic induction system of digitizer, in which contact or approach of a special purpose pen 130 (refer to FIG. 3) is detected. It is possible, as a digitizer, to adopt a resistance film system of digitizer, which is the so-called touch panel.

As seen from FIG. 1 and FIG. 2, a surroundings edge area 111a of the front 111 of the enclosure 110 is composed of a groove section 114 formed surrounding the surroundings edge area 111a over a round, and a part area 111b extending downward below the groove section 114.

Therefore, as seen from FIG. 3, the groove section 114 functions as a hold for fingers when the tablet PC 100 is held, and the tablet PC 10 can be well held even if the display screen 120 is turned to any direction.

As seen from FIG. 1 and FIG. 4, as for the groove section 114, detection sections 1141 for detecting scroll information according to the sliding operation by the operator are disposed on both the part where the groove of the groove section 114 near a lower right corner of four corners of the display screen 120 is extended to the vertical direction and the part where the groove is horizontally extended. The detection section 1141 detects both scroll information corresponding to sliding operation with a finger by an operator, and scroll information corresponding to sliding operation with the special purpose pen 130 by an operator. Moreover, the enclosure 110 incorporates therein a display control section 140 responsive to the detection of the scroll information by the detection section 1141 to scroll an image on the display screen 120.

Therefore, an operator recognizes the position of the detection section 1141 without seeing the hand, so that the operator can do the scroll operation intuitively. Thus, it is excellent in operability. Moreover, because both the scroll operation with the finger and the scroll operation with the special purpose pen 130 are possible, it is convenient. Moreover, the possibility of occurrence of a mis-operation is low as compared with a case where the detection section is installed in a convex part.

State display LEDs (Light Emitting Diodes) 1142 that display various states of the tablet PC 100 are provided in the upper part of the right side and the right center part of the groove section 114. Moreover, a speaker 1143 is provided in an upper center part of the groove section 114. A reception section 1144 that receives infrared rays signal transmitted from a wireless keyboard which will be described later is provided at the left of the speaker 1143.

As seen from FIG. 1, five security/tablet buttons 1110 of the push button controlled type are disposed at a right part in the part area 111b extending downward below the groove section 114 of the surroundings edge area 111a of the front 111 of the enclosure 110. These five security/tablet buttons 1110 are disposed in parallel with each other, in the order of the 1st button 1111, the 2nd button 1112, the 3rd button 1113, the 4th button 1114, and ENT button 1115 from the right side.

Each of the 1st button 1111, the 2nd button 1112, the 3rd button 1113 and the 4th button 1114 is a button used by the operator to enter a password at the time of log-in. Moreover, the ENT button 1115 is a button used when the input password is fixed.

Processing similar to that executed when the Ctrl key, the Alt key, and the Del key in a general keyboard are pressed at the same time is executed when the first button 1111 is kept being pressed for two or more seconds after the tablet PC 100 is started, so that the system can be forcibly canceled.

Moreover, the orientation of the entire image displayed on the display screen 120 is switched by 90 degrees whenever the second button 1112 is pressed after the tablet PC 100 is started, so that the display screen 120 can be used either in portrait or landscape orientation.

As mentioned above, since the groove section 114 that functions as a hold for fingers is provided in the tablet PC 100, even if the orientation of the entire image displayed on the display screen 120 is switched to be in a desired orientation so that the display screen 120 is used in either portrait or landscape orientation, the table PC 100 is provided with excellent holdability.

The third button 1113 and the fourth button 1114 are buttons by which the operator can allocate a desired function. After the tablet PC 100 is started, when the third button 1113 or the fourth button 111 to which a prescribed function is allocated beforehand is pressed and subsequently the ENT button 1115 is pressed, the allocated function is executed. The ENT button 1115 corresponds to 'Enter' key in a general keyboard.

As seen from FIG. 1, on the right side 112a of the side 112 of the enclosure 110, there are provided a pen storage slot 1121 that stores the special purpose pen 130 and a strap installation hole 1122 that installs a strap attached to the special purpose pen 130. A slide type of power supply button 1123 that turns on and off the main power supply is provided on the right side 112a. On the right side 112a, there are provided a fingerprint sensor 1124 that identifies the fingerprint for user authentication, a PC card slot 1125 into which a PC card not illustrated is inserted, a smart card slot 1126 into which a smart card not illustrated is inserted, a SD memory card slot 1127 into which a SD memory card not illustrated is inserted, and a first USB connector 1128 with which a USB (Universal Serial Bus) cable not illustrated is connected.

Figure 5:
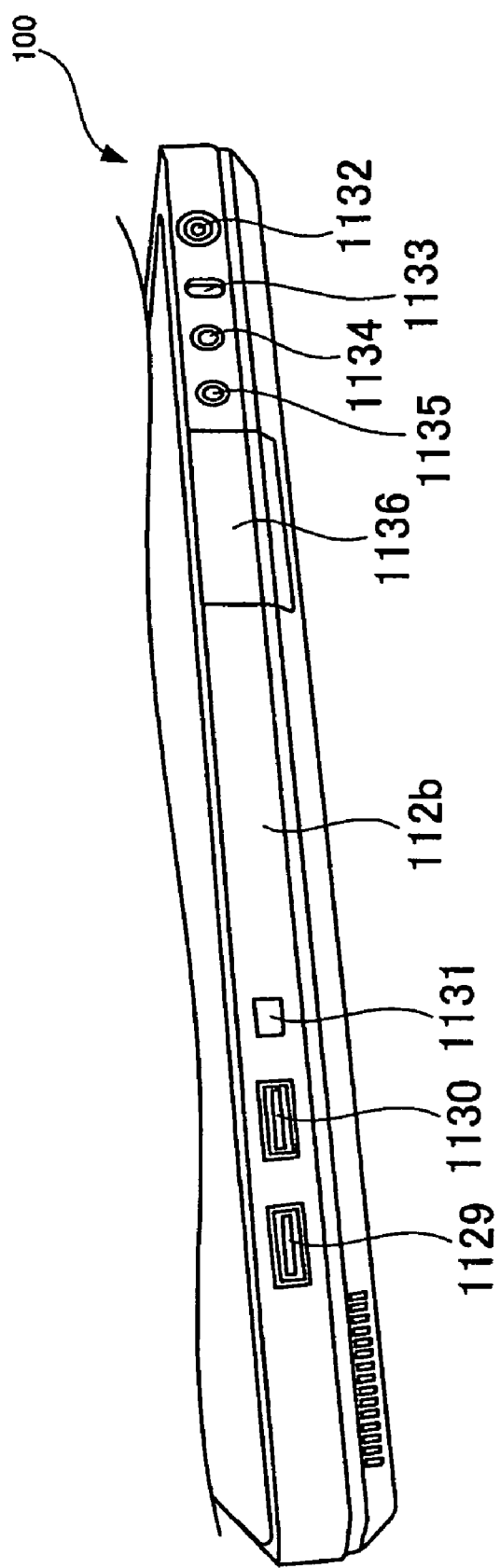
FIG. 5 is a side view where the tablet PC depicted in FIG. 1 is seen from a side.

FIG. 5 is a side view where the tablet PC 100 depicted in FIG. 1 is seen from a side.

As seen from FIG. 5, on an upper side 112b of the side 112 of the enclosure 110, there are provided a second USB connector 1129 to which a USB cable not illustrated is connected, a third USB connector 1130, and an IEEE1394 terminal 1131 to which an IEEE1394 cable not illustrated is connected. On the upper side 112b, there is provided further a power supply connector 1132 with which a power cable (not illustrated) that supplies the electric power to the tablet PC 100 is connected. Moreover, on the upper side 112b, there are further provided a security wire lock installation hole 1133 that fixes a security wire not illustrated, a headphone terminal 1134 with which a headphone not illustrated is connected, a microphone terminal 1135 with which a microphone not illustrated is connected, and an external display terminal with which a VGA connector of a cable connected with an external display not illustrated is connected. The external display terminal is covered by a terminal cover 1136.

Figure 6:
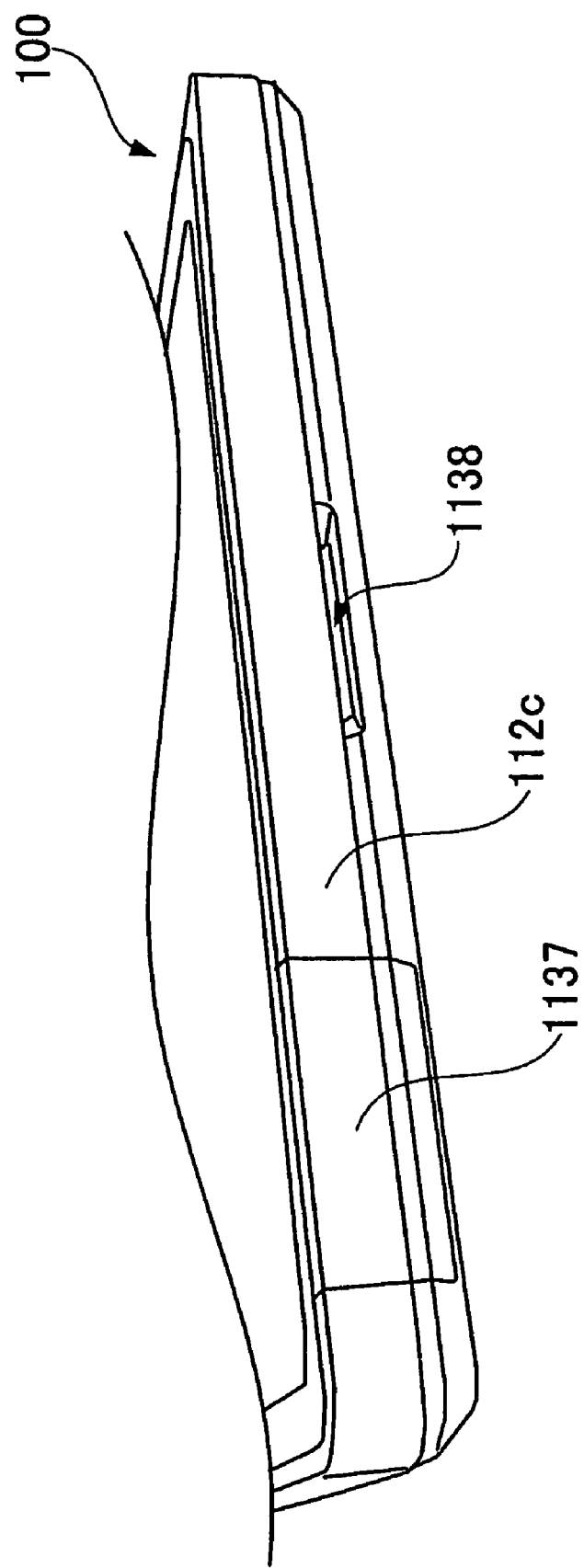
FIG. 6 is a left side view where the tablet PC depicted in FIG. 1 is seen from the left side.

FIG. 6 is a left side view where the tablet PC 100 depicted in FIG. 1 is seen from the left side.

As seen from FIG. 6, on a left side 112c of the side 112 of the enclosure 110, there are provided a LAN connector with which a LAN (Local Area Network) cable not illustrated is connected, and a modem connector with which a modular cable not illustrated is connected. The LAN connector and the modem connector are covered by a connector cover 1137. On the left side 112c, there is provided a concave section 1138 connected with a engagement section 341 disposed on a guide member 340 of a docking station 300 which will be described later.

Figure 7:
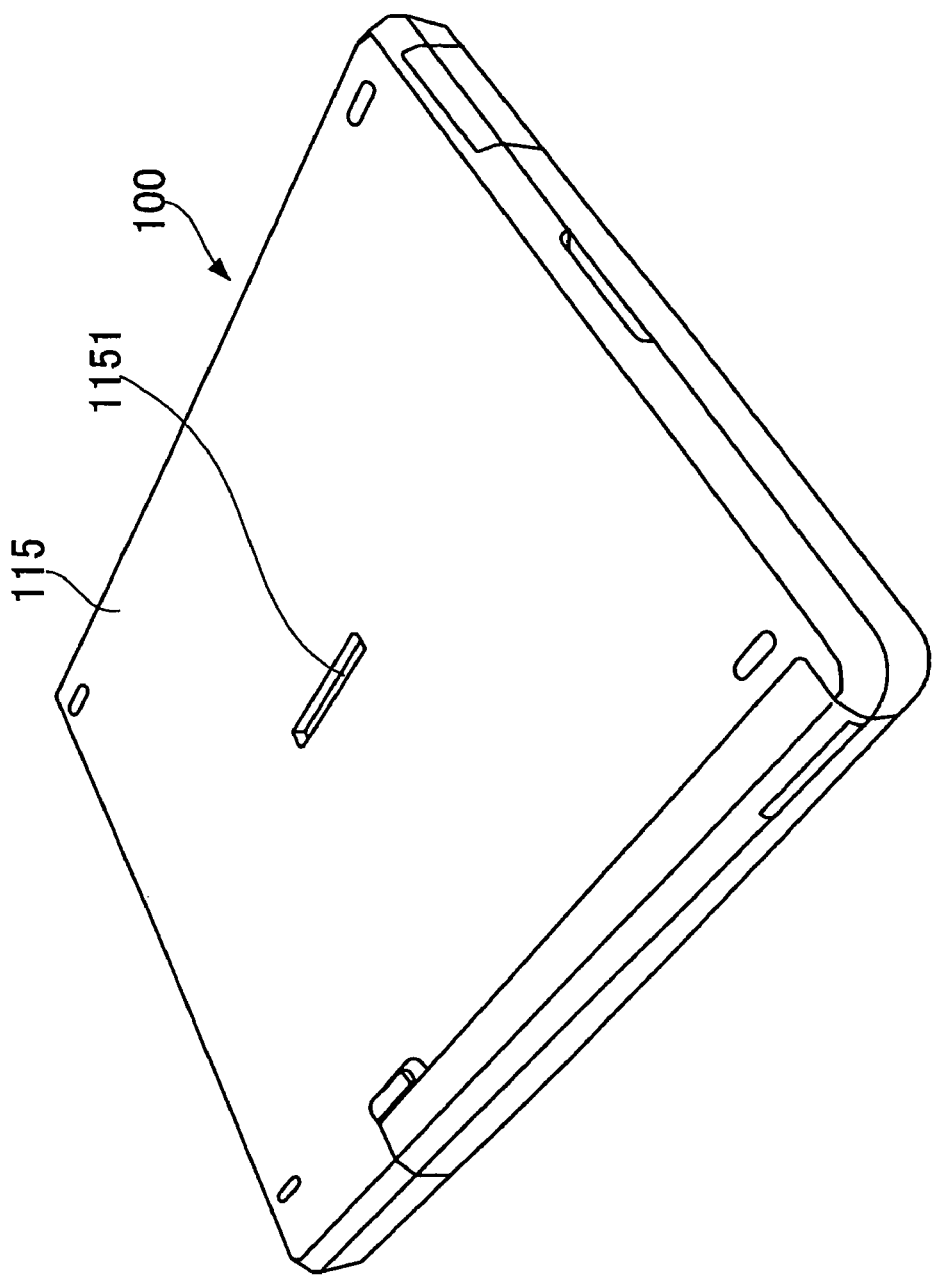
FIG. 7 is a perspective view of the tablet PC depicted in FIG. 1, when viewed obliquely from the upper back.

FIG. 7 is a perspective view of the tablet PC 100 depicted in FIG. 1, when viewed obliquely from the upper back.

As seen from FIG. 7, a docking station connection connector 1151 for connecting a docking station 300 (refer to FIG. 14) described later is disposed in a back 115 of the enclosure 110 (lower side in FIG. 7).

Figure 8:
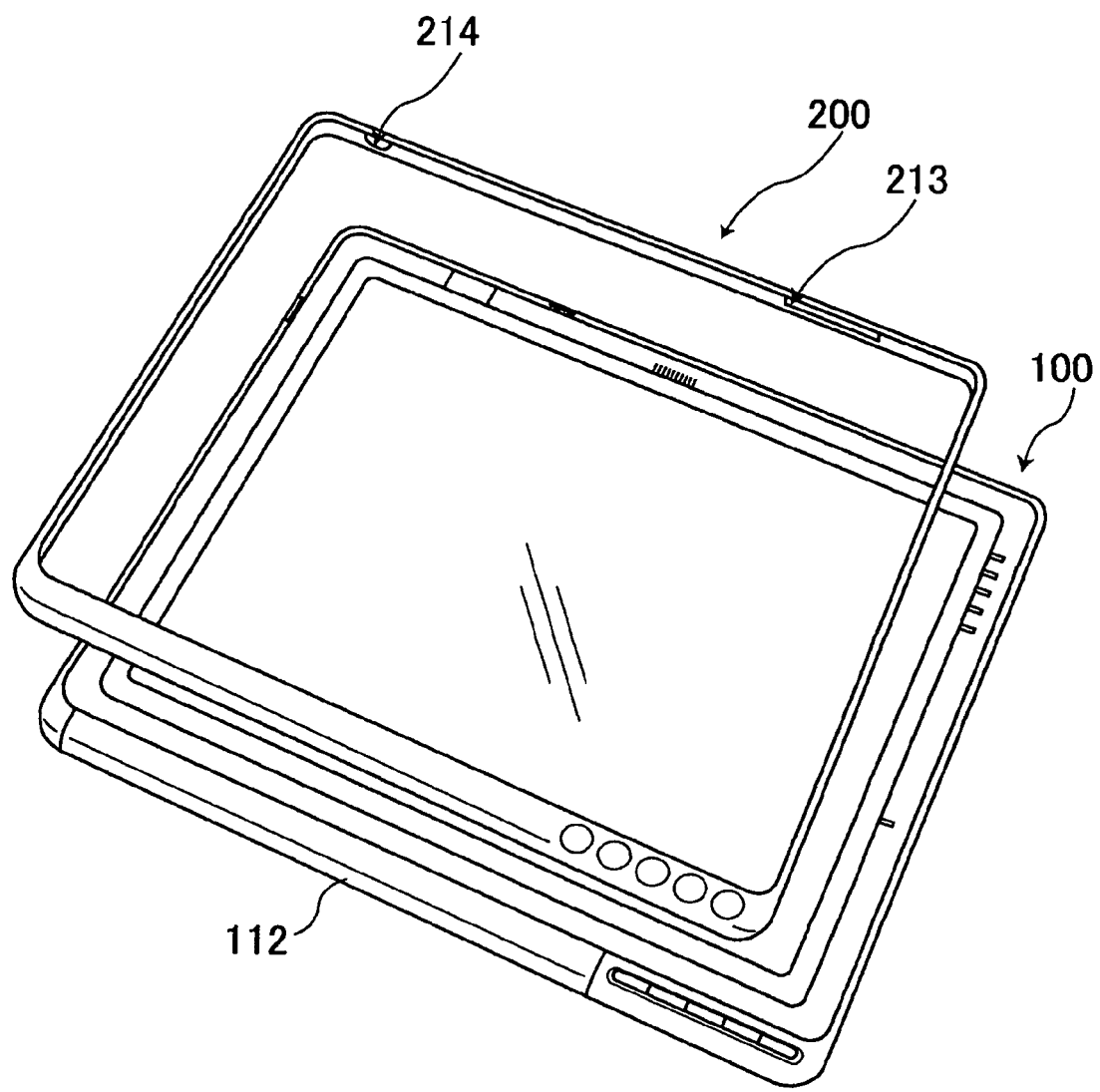
FIG. 8 is a perspective view of the tablet PC depicted in FIG. 1 and a case protection cover attached to the tablet PC, when viewed obliquely from the upper front.
Figure 9:
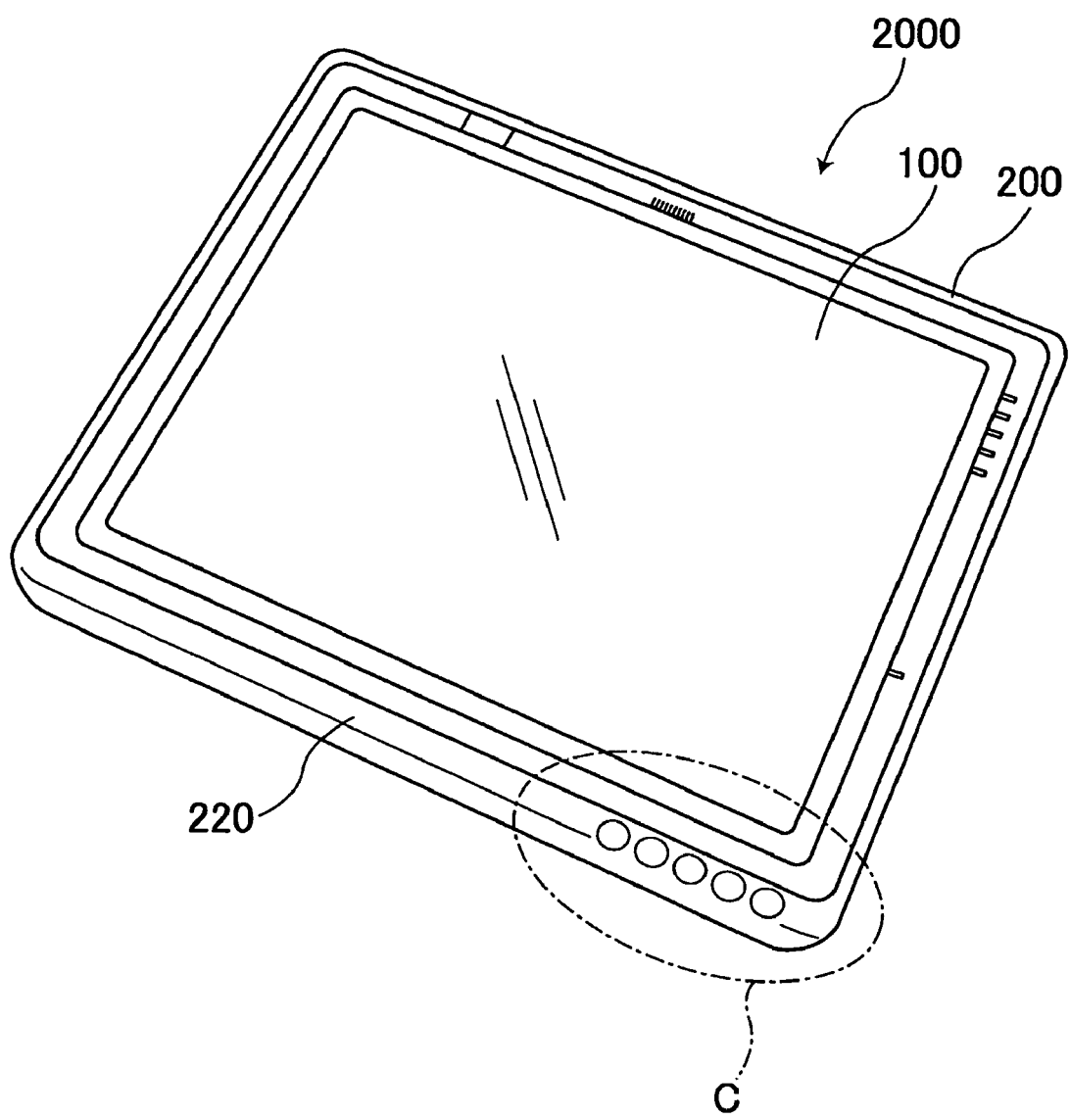
FIG. 9 is a perspective view where an electronic device system in which the case protection cover depicted in FIG. 8 is attached to the tablet PC is seen obliquely from the upper front.

FIG. 8 is a perspective view of the tablet PC 100 depicted in FIG. 1 and a case protection cover 200 attached to the tablet PC 100, when viewed obliquely from the upper front. FIG. 9 is a perspective view where an electronic device system 2000 in which the case protection cover 200 depicted in FIG. 8 is attached to the tablet PC 100 is seen obliquely from the upper front.

As seen from FIG. 8 and FIG. 9, the case protection cover 200 is detachably mounted on the tablet PC100 which has been described referring to FIG. 1 to FIG. 7. The case protection cover 200 is made of an elasticity material and surrounds the side 112 of the enclosure 110 of the tablet PC 100.

Therefore, installation of the case protection cover 200 in the tablet PC 100 makes it possible to ease impacts of the fall and the collision, deteriorating neither the operability nor the portability of the tablet PC 100, so that tablet PC 100 can be protected from the impact. Especially, since the case protection cover 200 is made of an elasticity material, the case protection cover 200 is elastically deformable, so that impacts of the fall and the collision can be absorbed efficiently. In addition, although the enclosure 110 of the tablet PC 100 is made of a resin material, holdability improves by attaching the case protection cover 200 made of the elastic material whose coefficient of friction is higher than the resin material to the tablet PC 100. Moreover, since the case protection cover 200 is detachably mounted on the tablet PC 100, the user can select either attachment or detachment of the case protection cover 200 in accordance with the system requirements, and thus the tablet PC 100 is not enlarged. In addition, attachment of the case protection cover 200 to the tablet PC 100 can change the image in terms of design.

Figure 10:
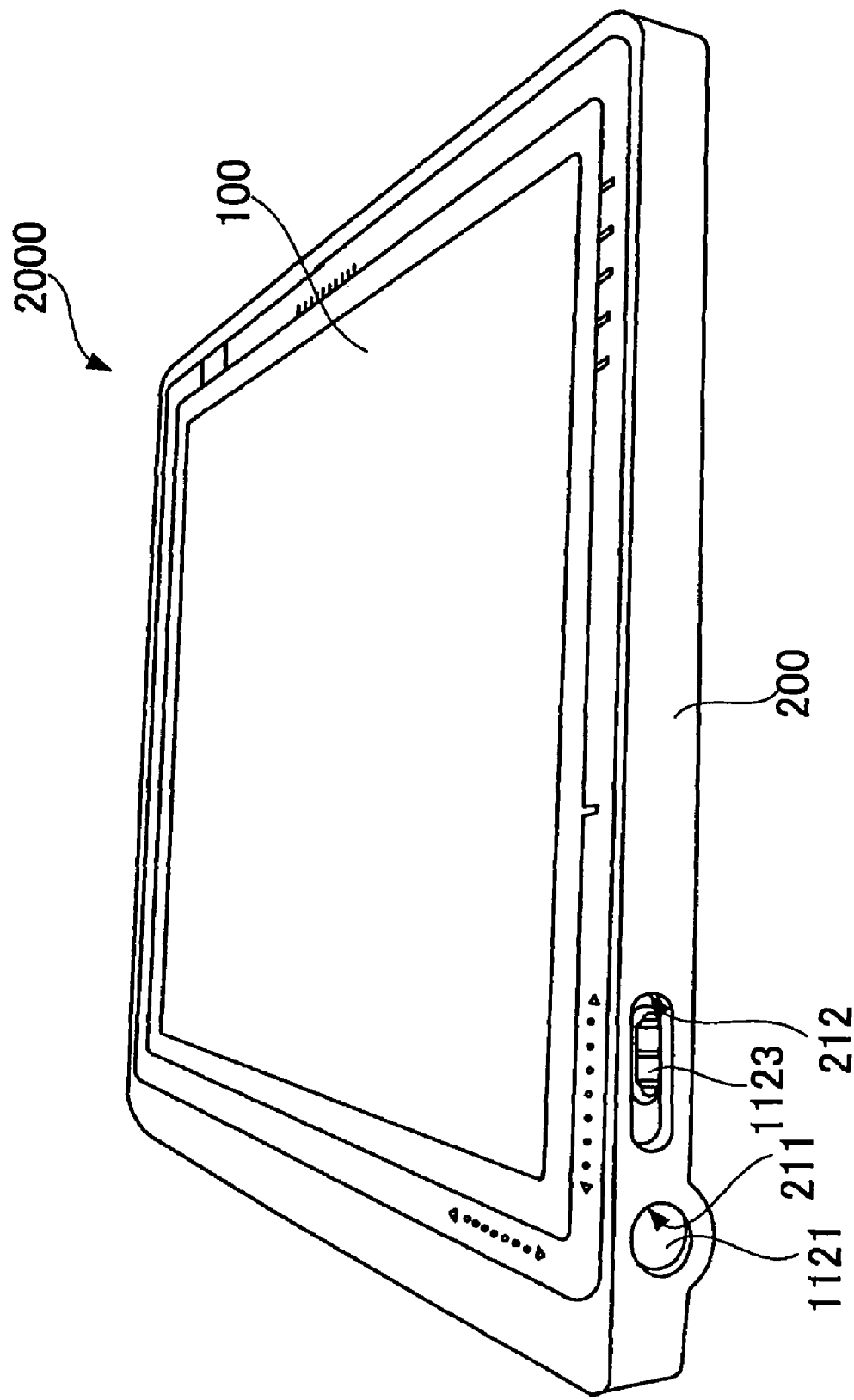
FIG. 10 is a perspective view of the electronic device system depicted in FIG. 9 when the front is viewed obliquely from the right.
Figure 11:
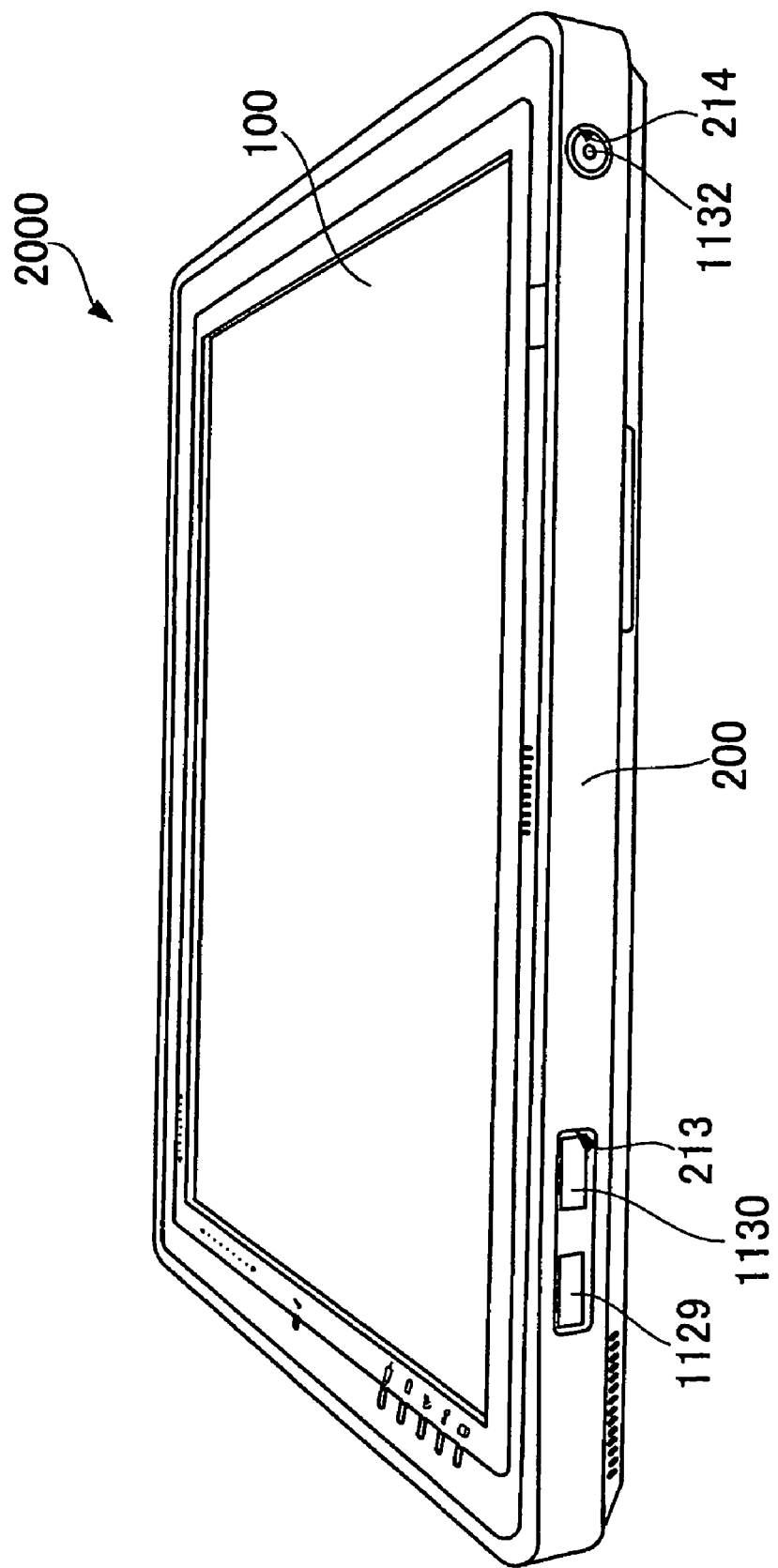
FIG. 11 is a perspective view of the electronic device system depicted in FIG. 9 when the front is obliquely viewed from the top.
Figure 12:
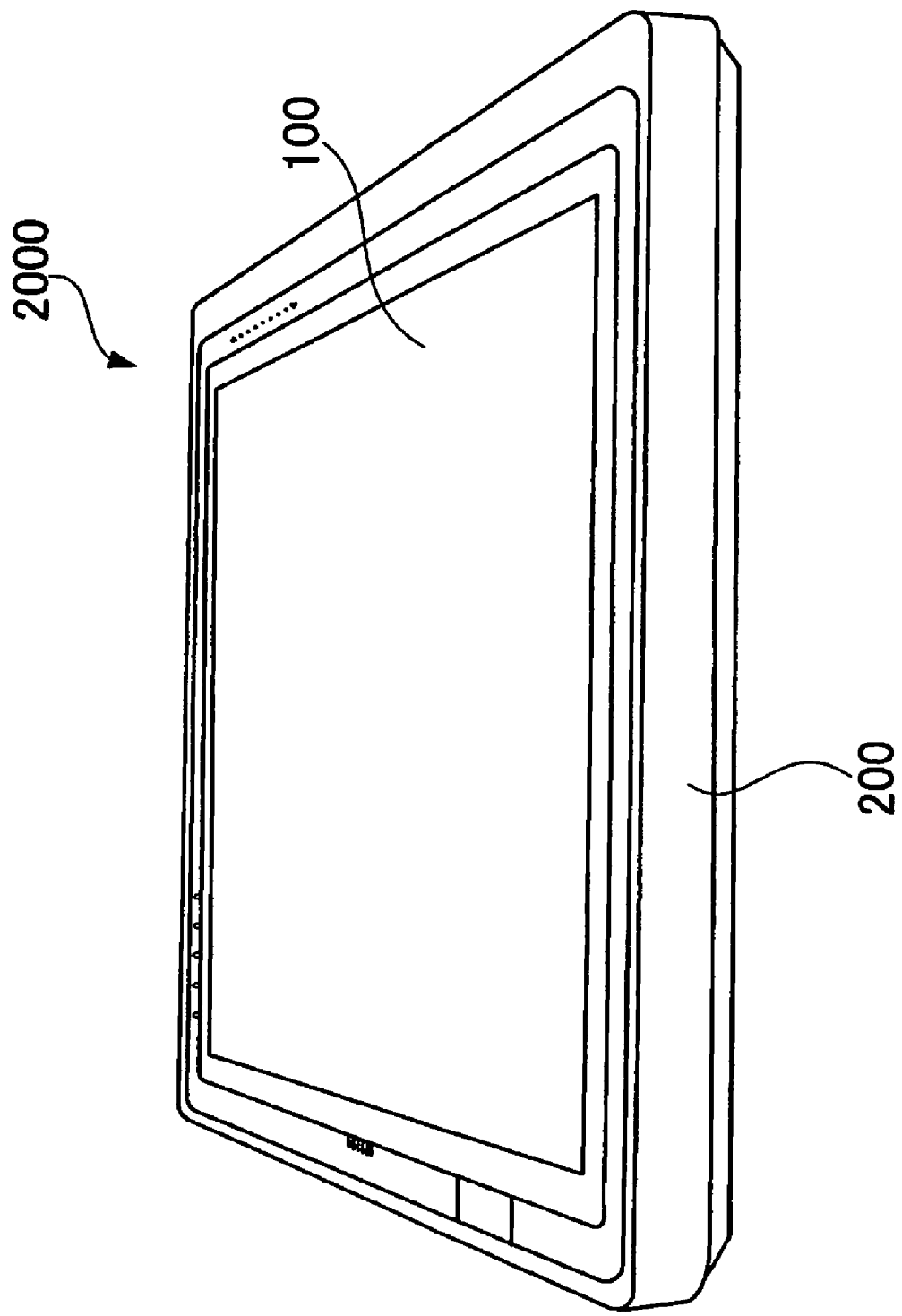
FIG. 12 is a perspective view of the electronic device system depicted in FIG. 9 when the front is obliquely viewed from the left.

FIG. 10 is a perspective view of the electronic device system 2000 depicted in FIG. 9 when the front is viewed obliquely from the right. FIG. 11 is a perspective view of the electronic device system 2000 depicted in FIG. 9 when the front is obliquely viewed from the top. FIG. 12 is a perspective view of the electronic device system 2000 depicted in FIG. 9 when the front is obliquely viewed from the left.

As seen from FIG. 10 to FIG. 12, the case protection cover 200 covers the fingerprint sensor 1124 disposed at the right side 112a of the side 112 of the enclosure 110 depicted in FIG. 1, the PC card slot 1125, the smart card slot 1126, the SD memory card slot 1127, and the first USB connector 1128. Moreover, the case protection cover 200 covers an IEEE1394 terminal 1131 disposed at the upper side 112b of the sides 112 of the enclosure 110 depicted in FIG. 5, the security wire lock installation hole 1133, the headphone terminal 1134, the microphone terminal 1135, and the terminal cover 1136. In addition, the case protection cover 200 covers the connector cover 1137 which is disposed at the left side 112c of the side 112 of the enclosure 110 depicted in FIG. 6. It is assumed that these connectors and the like are comparatively low in use frequency.

As seen from FIG. 10 to FIG. 12, the case protection cover 200 has a first aperture 211 that causes the pen storage slot 1121 disposed at the right side 112a of the sides 112 of the enclosure 110 to be exposed, and a second aperture 212 that causes the power supply button 1123 disposed at the right side 112a to be exposed. The case protection cover 200 further has a third aperture 213 that causes both the second USB connector 1129 and the third USB connector 1130 disposed on the upper side 112b of the sides 112 of the enclosure 110 to expose, and a fourth aperture 214 that causes the power supply connector 1132 disposed on the upper side 112b to expose. It is assumed that these connectors and the like are comparatively high in use frequency.

Thus, the case protection cover 200 covers the connectors and the like expected to be comparatively low in use frequency among the connectors disposed at the side 112 of the enclosure 110, and the case protection cover 200 has the first aperture 211, the second aperture 212, third aperture 213, and the fourth aperture 214, which cause the connectors and the like expected to be comparatively low in use frequency to be exposed. Accordingly, installation of the case protection cover 200 in the tablet PC 100 makes it possible to protect the connectors and the like expected to be comparatively low in use frequency from dust and moisture. Moreover, even in a state where the case protection cover 200 is attached to the tablet PC 100, it is possible to use the pen storage slot 1121, the power supply button 1123, the second USB connector 1129, the third USB connector 1130, and the power supply connector 1132, which are expected to be comparatively high in use frequency.

Figure 13:
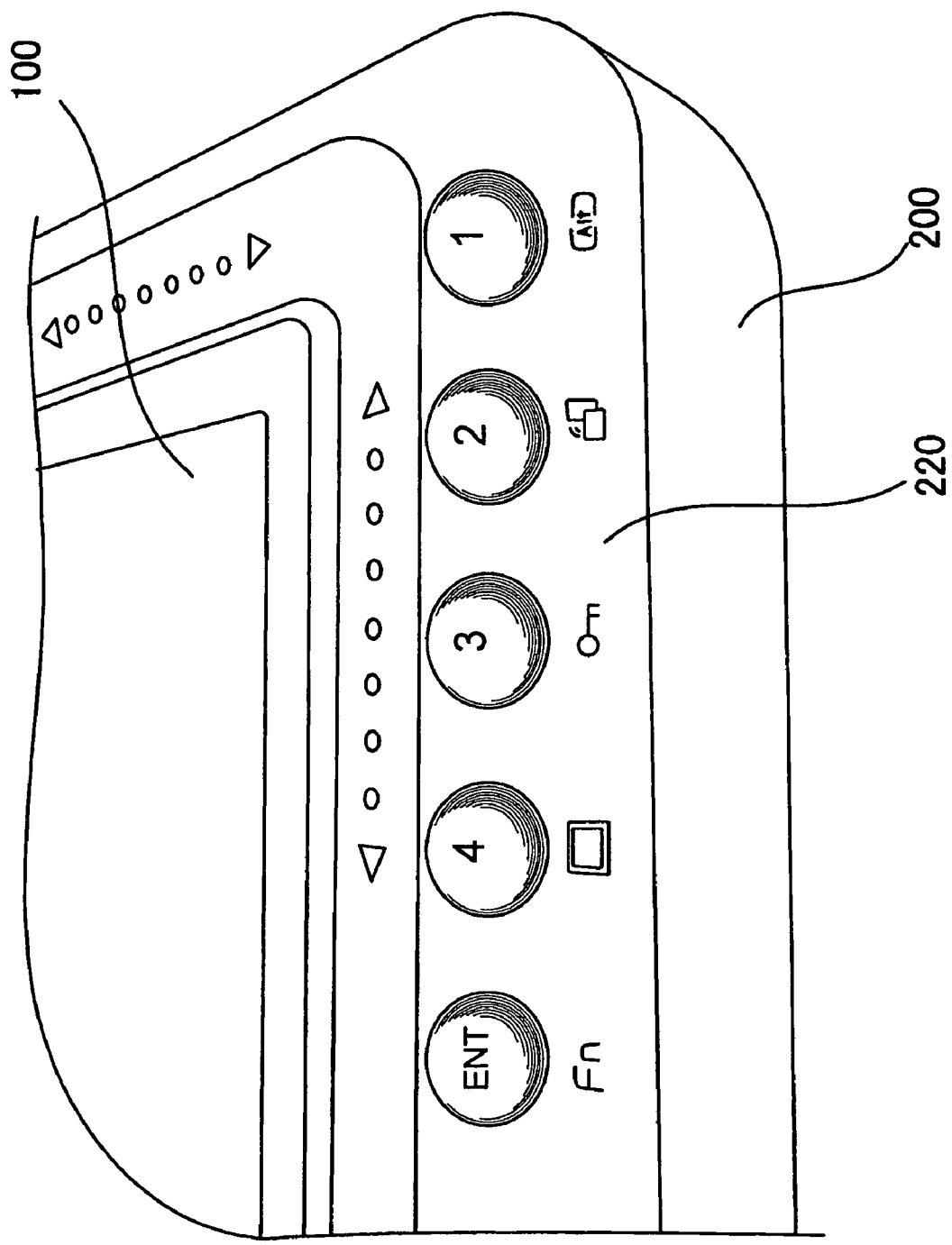
FIG. 13 is an enlarged perspective view of a portion C in FIG. 9.

FIG. 13 is an enlarged perspective view of the portion C in FIG. 9.

As seen from FIG. 9 and FIG. 13, the case protection cover 200 has a front covering part 220 with which the part area 111b is covered, where five security/tablet buttons 1110 are disposed. The front covering part 220 has a swelling portion right above each of the 1st button 1111, the 2nd button 1112, the 3rd button 1113, the 4th button 1114, and the ENT button 1115 that are the security/tablet buttons 1110 covered with the front covering part 220. The swelling portion presses each of these security/tablet buttons 1110 when pushed.

Accordingly, even in a state where the case protection cover 200 is attached to the tablet PC 100, it is possible to recognize the position of the security/tablet button 1110 and press the security/tablet button 1110 with the excellent operability. Moreover, the attachment of the case protection cover 200 to the tablet PC 100 makes it possible to protect the security/tablet button 1110 from dust and moisture.

Figure 14:
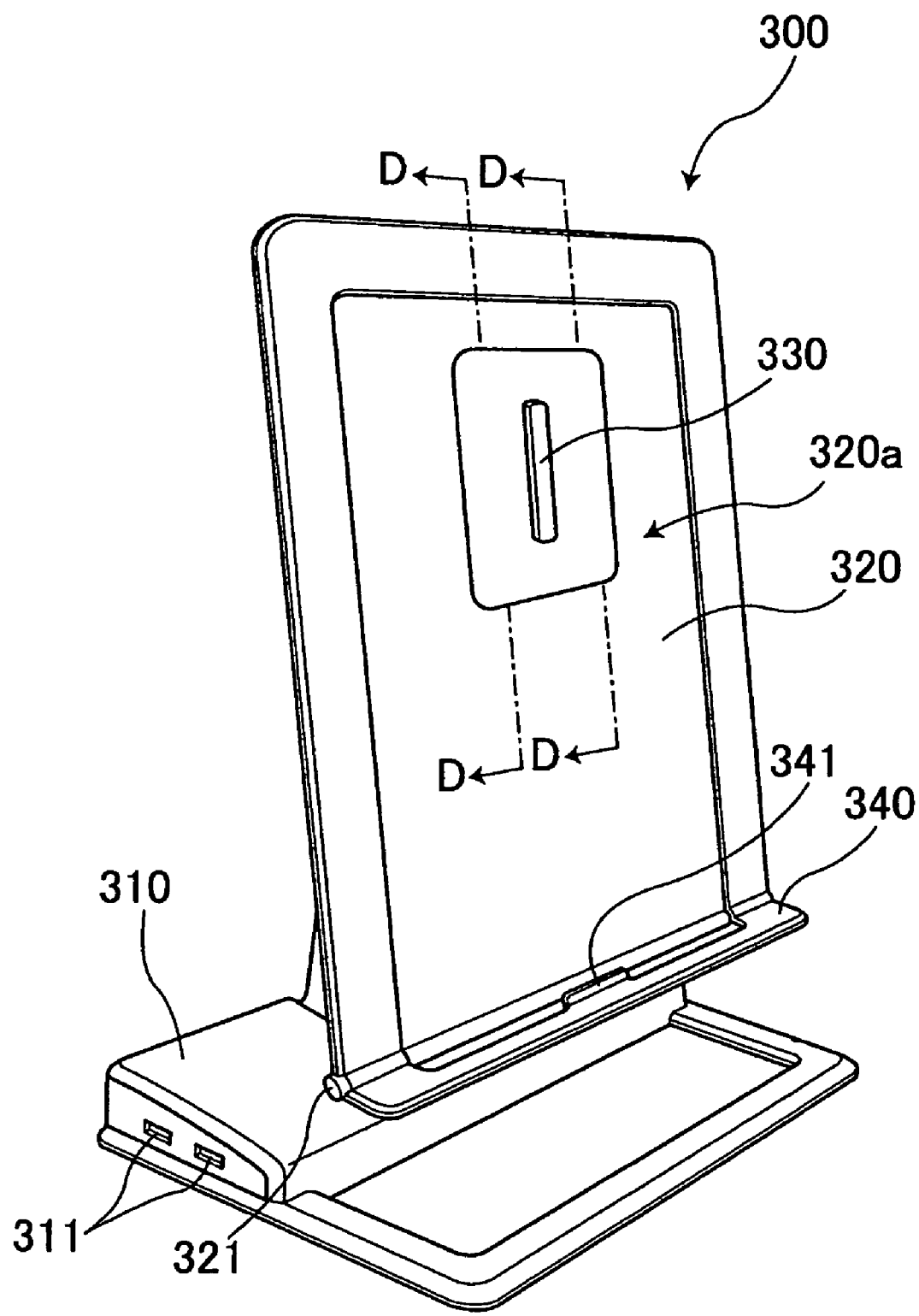
FIG. 14 is a perspective view of a docking station when viewed obliquely from the upper front.

FIG. 14 is a perspective view of a docking station 300 when viewed obliquely from the upper front.

The docking station 300 depicted in FIG. 14 is a connecting device that detachably holds the tablet PC 100 which is described referring to FIG. 1 to FIG. 7, and mediates the signal I/O between the tablet PC 100 and an external device not illustrated.

The docking station 300 is provided with a base section 310, a support board 320, a joint section 330, and a guide material 340.

The foundation 310 has two USB connectors 311 and 312 with which the USB cable not illustrated is connected.

Figure 15:
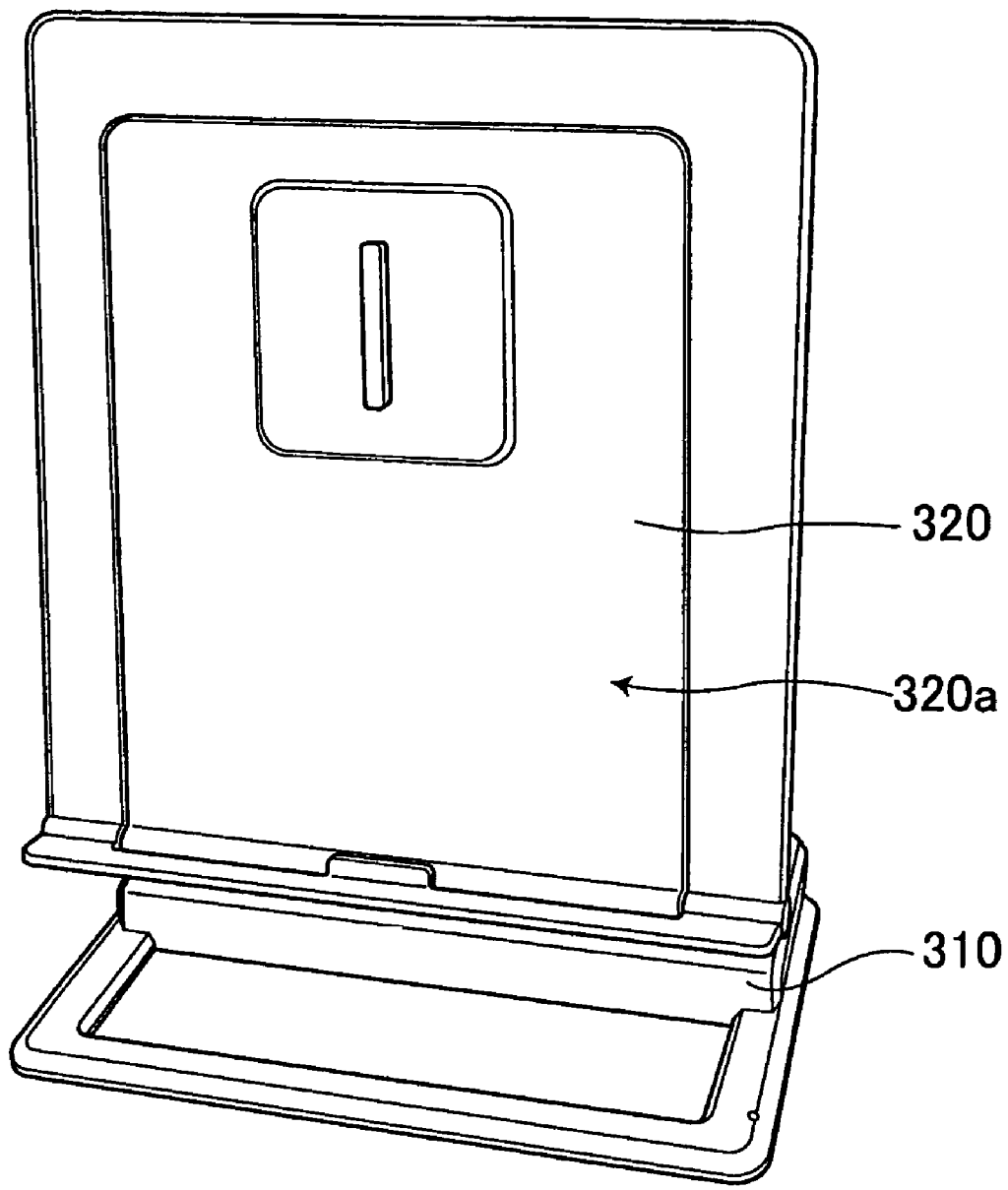
FIG. 15 is a perspective view of the docking station in the state of holding the tablet PC in the portrait orientation, when viewed obliquely from the upper front.
Figure 16:
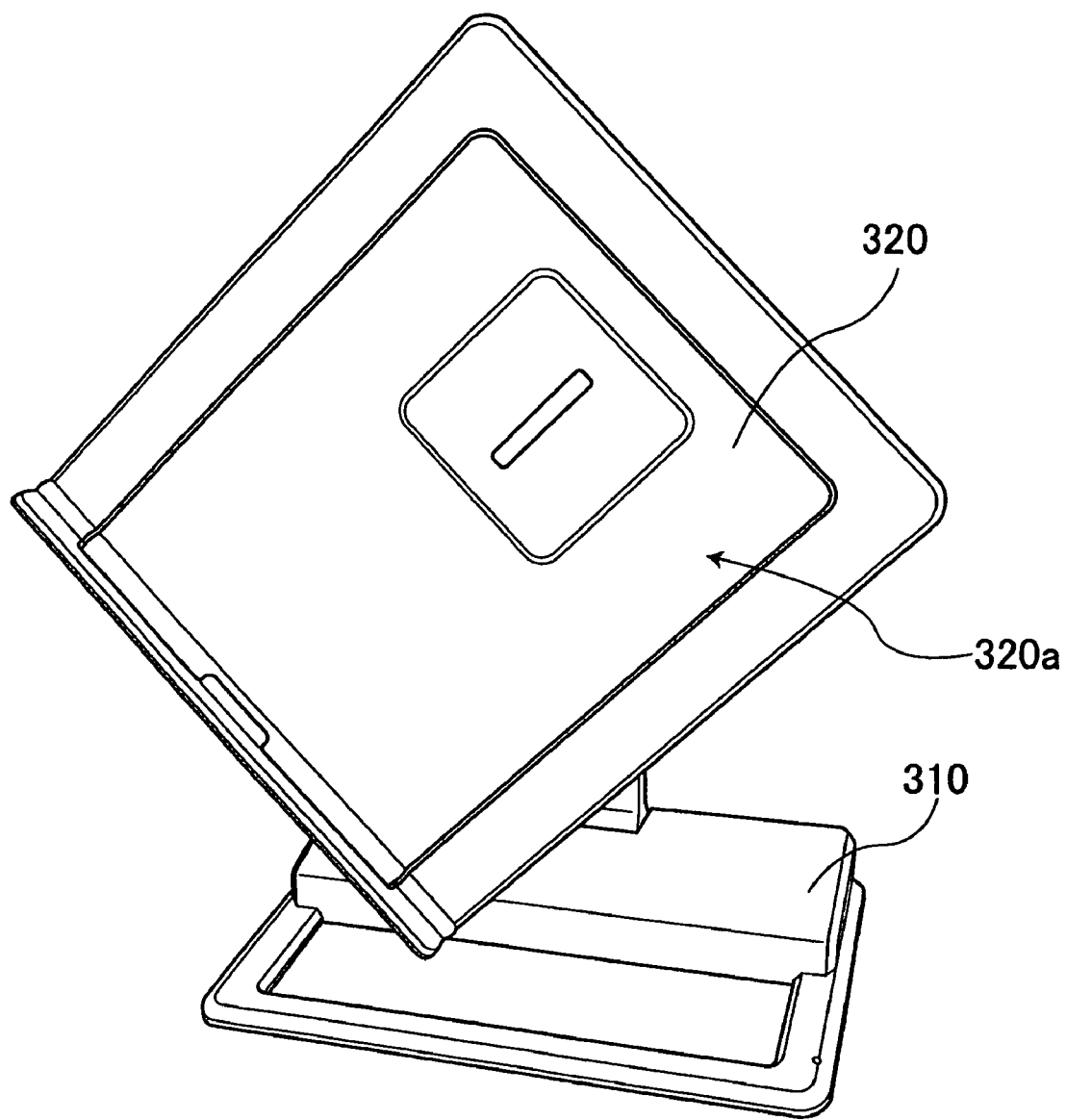
FIG. 16 is a perspective view of the docking station, when obliquely viewed from the upper front, in the state of shifting the tablet PC from the portrait orientation to the landscape orientation.
Figure 17:
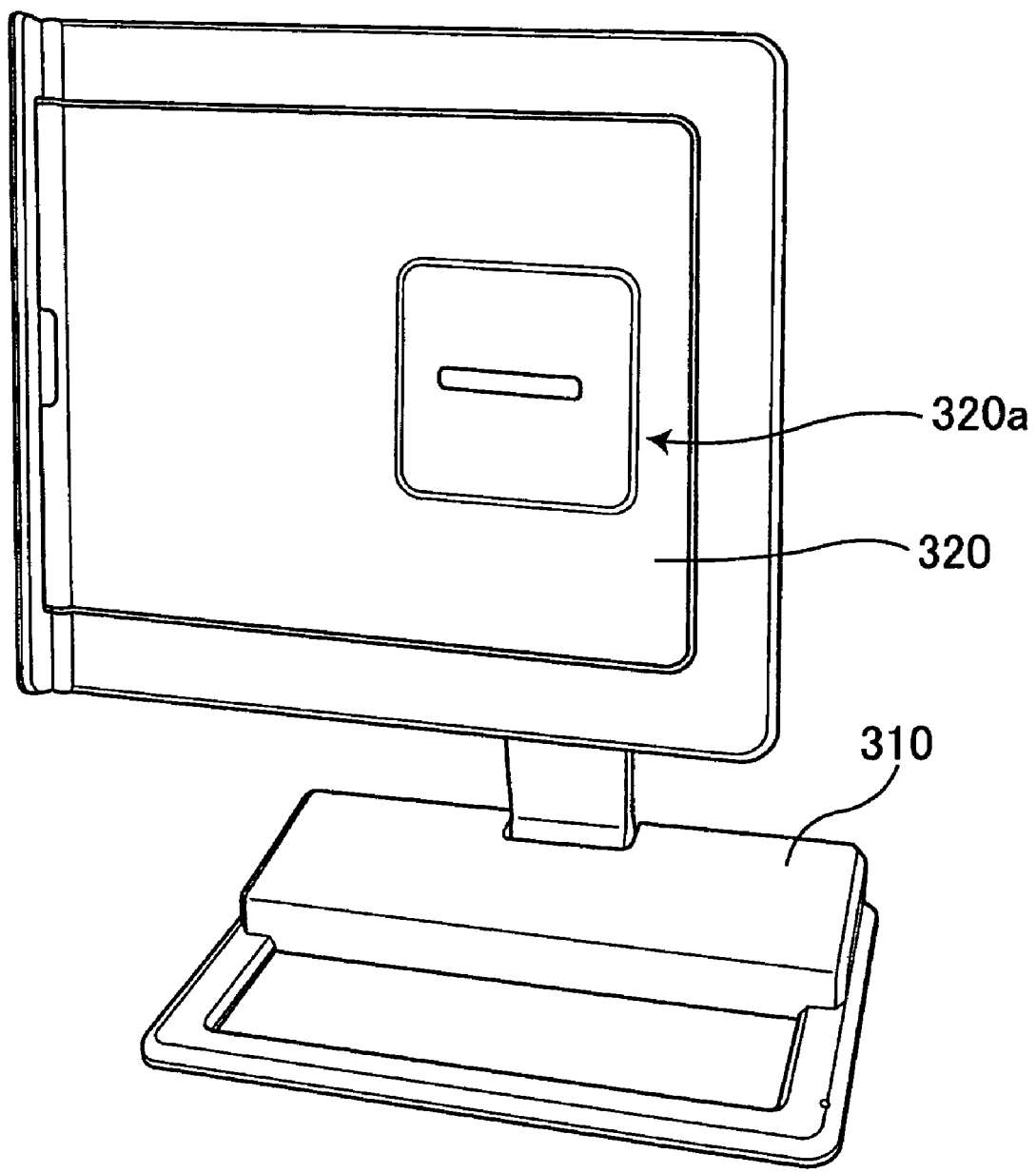
FIG. 17 is a perspective view of the docking station in the state of holding the tablet PC in the landscape orientation, when viewed obliquely from the upper front.

FIG. 15 is a perspective view of the docking station 300 in the state of holding the tablet PC 100 in the portrait orientation, when viewed obliquely from the upper front. FIG. 16 is a perspective view of the docking station 300, when obliquely viewed from the upper front, in the state of shifting the tablet PC 10 from the portrait orientation to the landscape orientation. FIG. 17 is a perspective view of the docking station 300 in the state of holding the tablet PC 100 in the landscape orientation, when viewed obliquely from the upper front.

As seen from FIG. 15 to FIG. 17, the support board 320 is pivotably connected with the base section 310 around a line perpendicular to the surface 320a of the support board 320.

Therefore, when the tablet PC 100 with the display screen 120 that can be used in either the portrait or the landscape orientation is attached to the docking station 300, it is possible to select the orientation of the support board 320 in accordance with the orientation of the entire image to be displayed on the display screen 120, and thus it is convenient.

Figure 18:
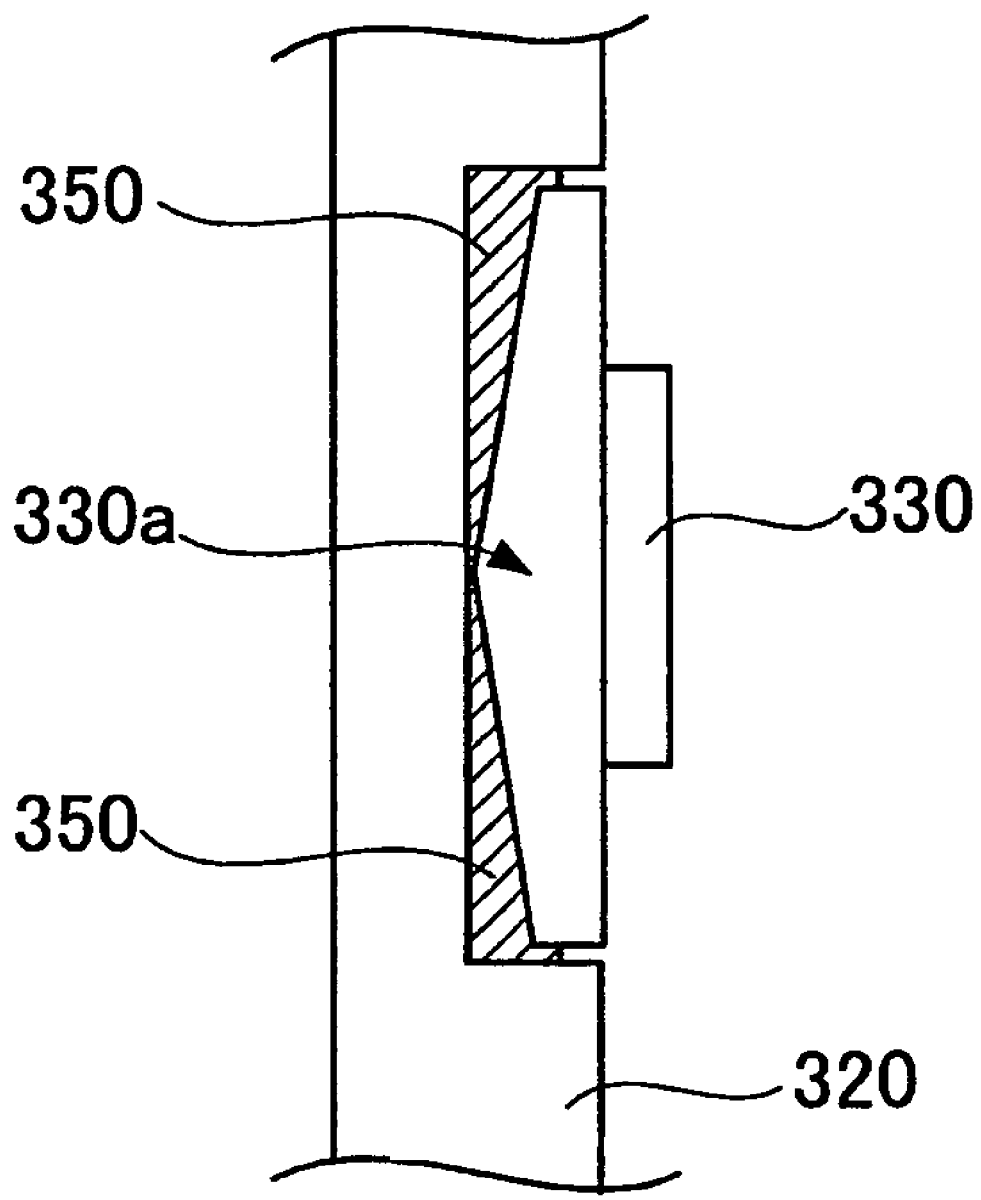
FIG. 18 is a sectional view taken along a line D-D of FIG. 14.

FIG. 18 is a sectional view taken along the line D-D of FIG. 14.

As seen from FIG. 14, the joint section 330 is disposed on the surface 320a of the support board 320, and the docking station connection connector 1151, which is disposed on the back 115 of the tablet PC 100 depicted in FIG. 7, is connected to the joint section 330. As seen from FIG. 18, a back 330a of parts on both sides of the joint section 330 is shaped like a mountain, and the joint section 330 is embedded in the support board 320 through an elastic material 350. Thanks to this structure, the joint section 330 is disposed on the support board 320 so as to be pivotable in the same direction as the turning direction of the tablet PC 100 guided by the guide material 340 which will be described later.

Accordingly, the degree of freedom in the connection between the joint section 330 that is the docking station side joint section and the docking station connection connector 1151 that is the tablet PC side joint section is high, i.e., smooth connection can be realized.

According to the present embodiment, the base section 310 is provided with the USB connectors 311 and 312. Therefore, if an external device is connected to the USB connectors 311 and 312 through a USB cable beforehand, connection between the tablet PC 100 and the external device can be achieved by merely attaching the tablet PC 100 to the docking station 300. In other words, there is no need to detach the external device whenever the tablet PC 100 is switched between use on the desk and portable use. Therefore, the switch between the use on the desk and the portable use of the tablet PC 100 can be easily carried out, which is convenient.

Figure 19:
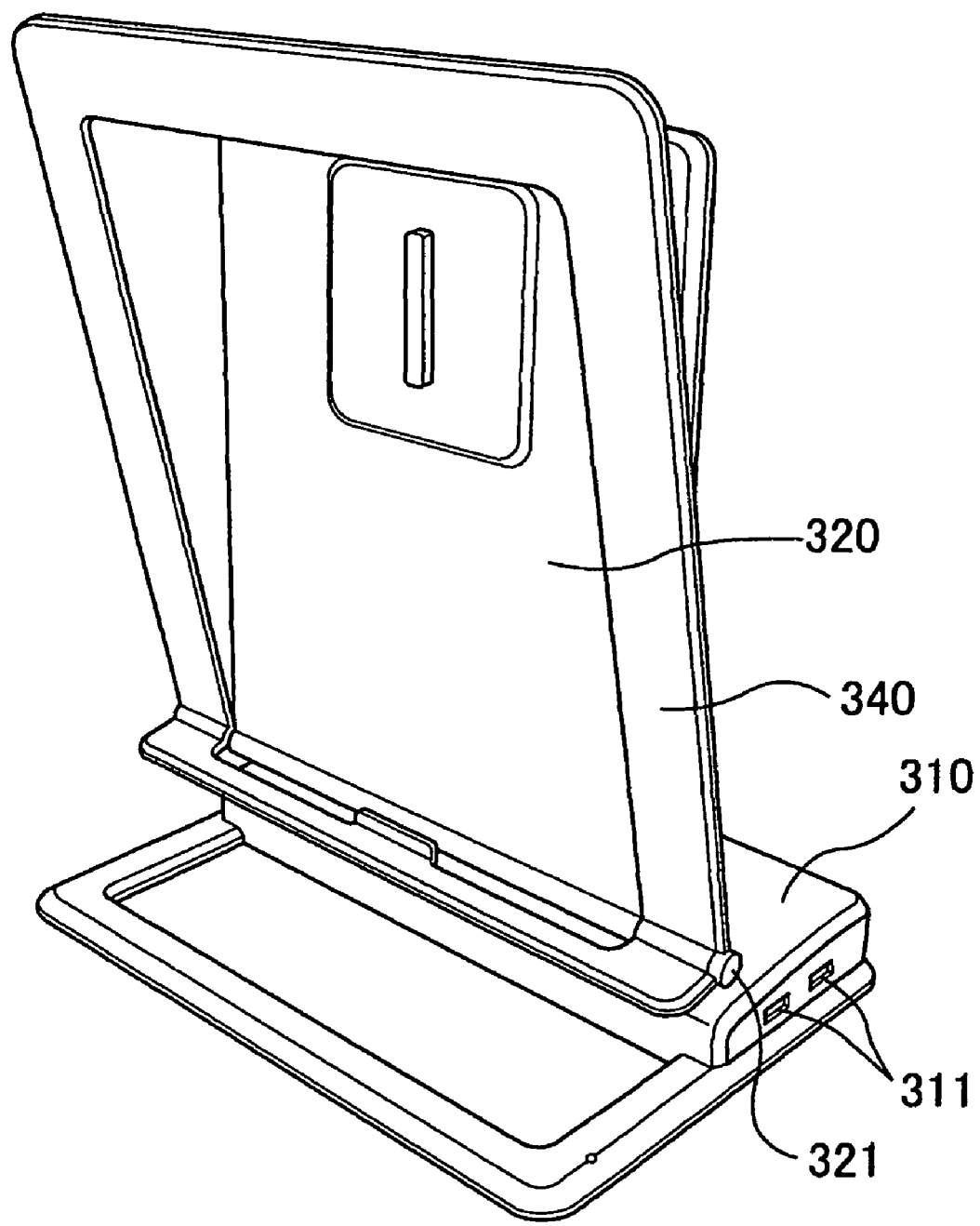
FIG. 19 is a perspective view of a guide material of the docking station depicted in FIG. 14 in the state of being turned, when viewed obliquely from the upper front.

FIG. 19 is a perspective view of the guide material 340 of the docking station 300 depicted in FIG. 14 in the state of being turned, when viewed obliquely from the upper front.

As seen from FIG. 14 and FIG. 19, the guide material 340 is supported by a bottom 321 of the support board 320 and pivotable in the direction where the guide material 340 approaches or leaves the support board 320 on the bottom 321. The guide material 340 has an engagement section 341 to be engaged in the concave section 1138 (refer to FIG. 6) formed in the left side 112c of the tablet PC 100 (refer to FIG. 6).

Figure 20:
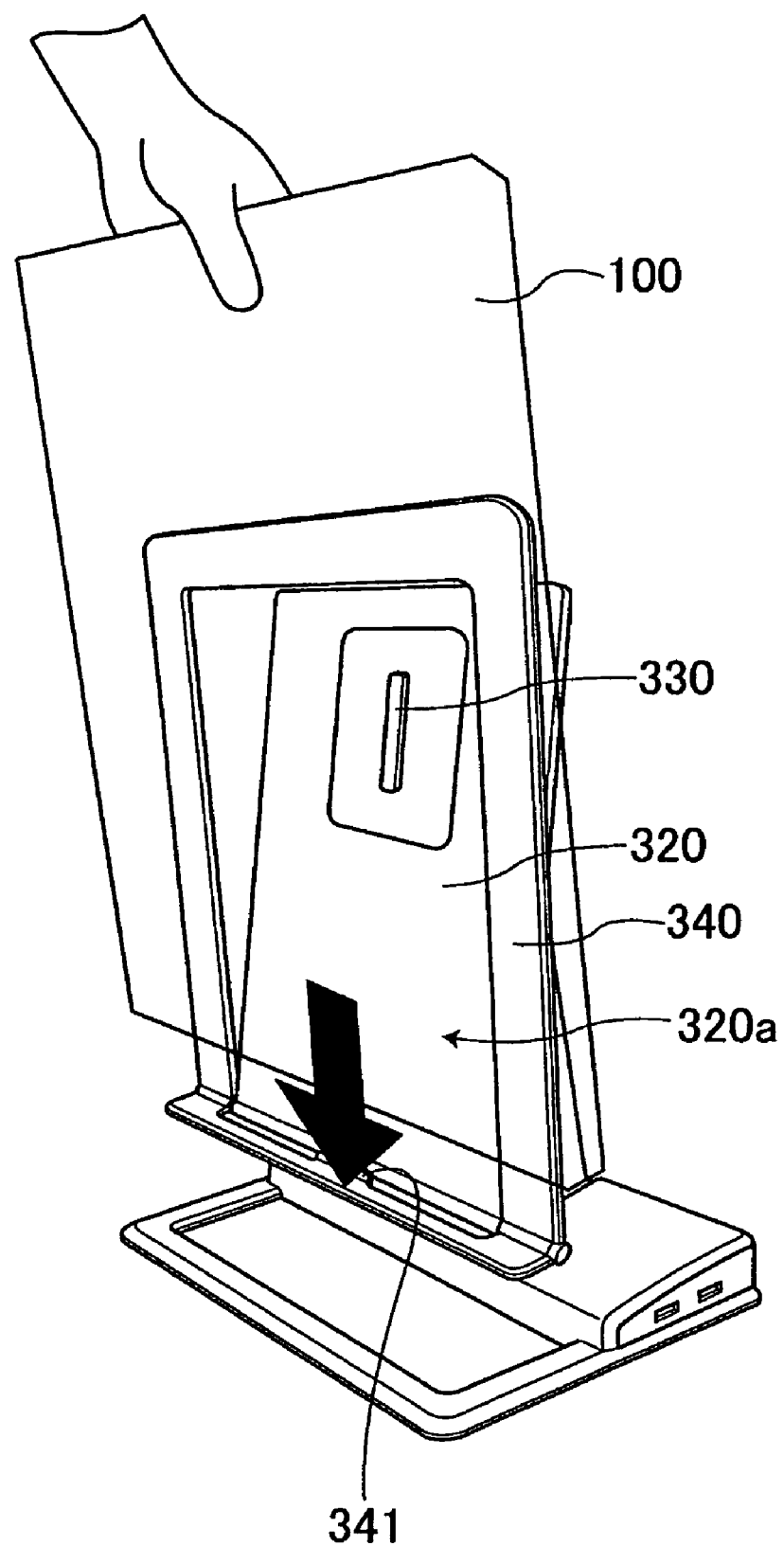
FIG. 20 is a perspective view where a detached state is depicted.
Figure 21:
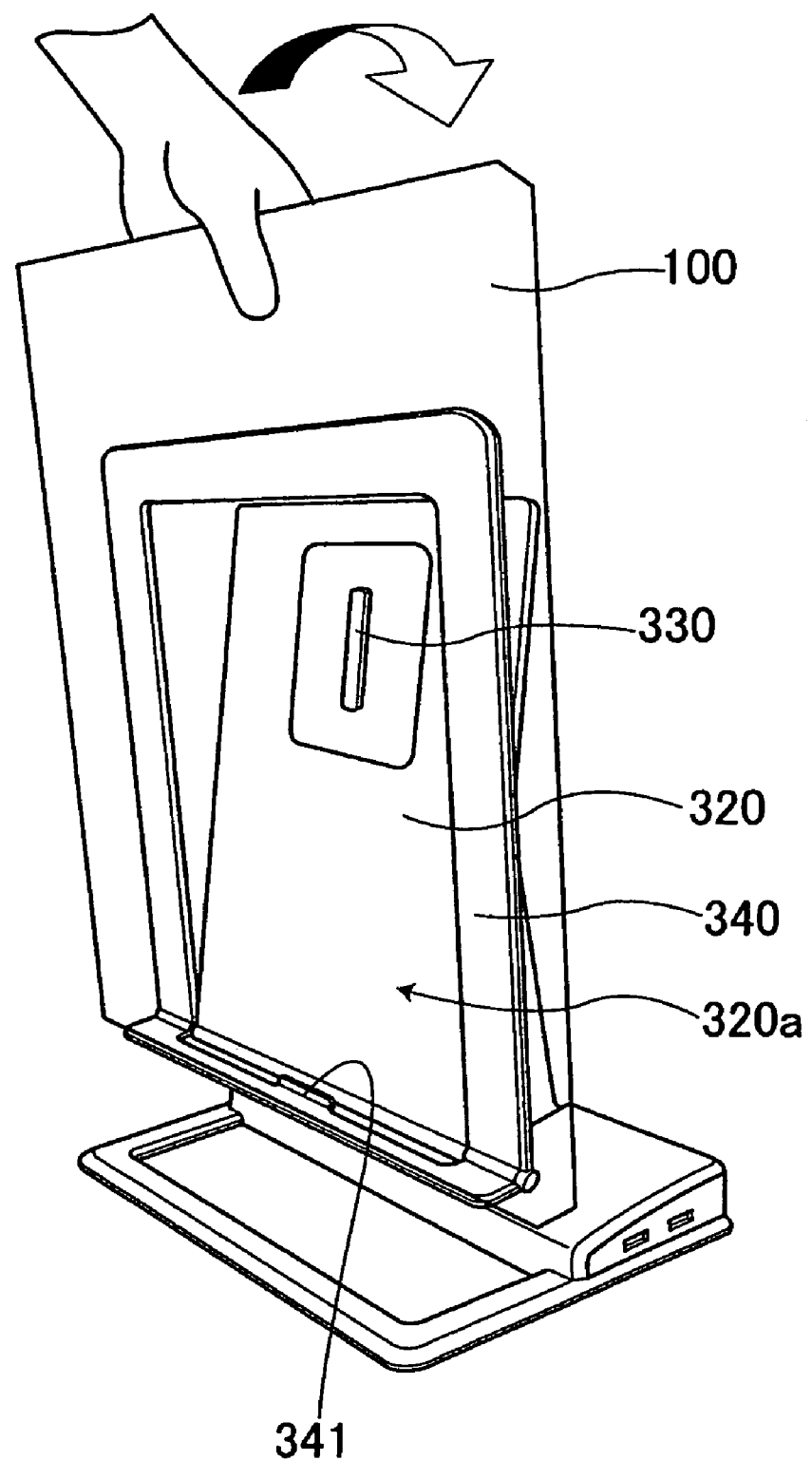
FIG. 21 is a perspective view illustrating a state of shifting from the detached state to an attached state.
Figure 22:
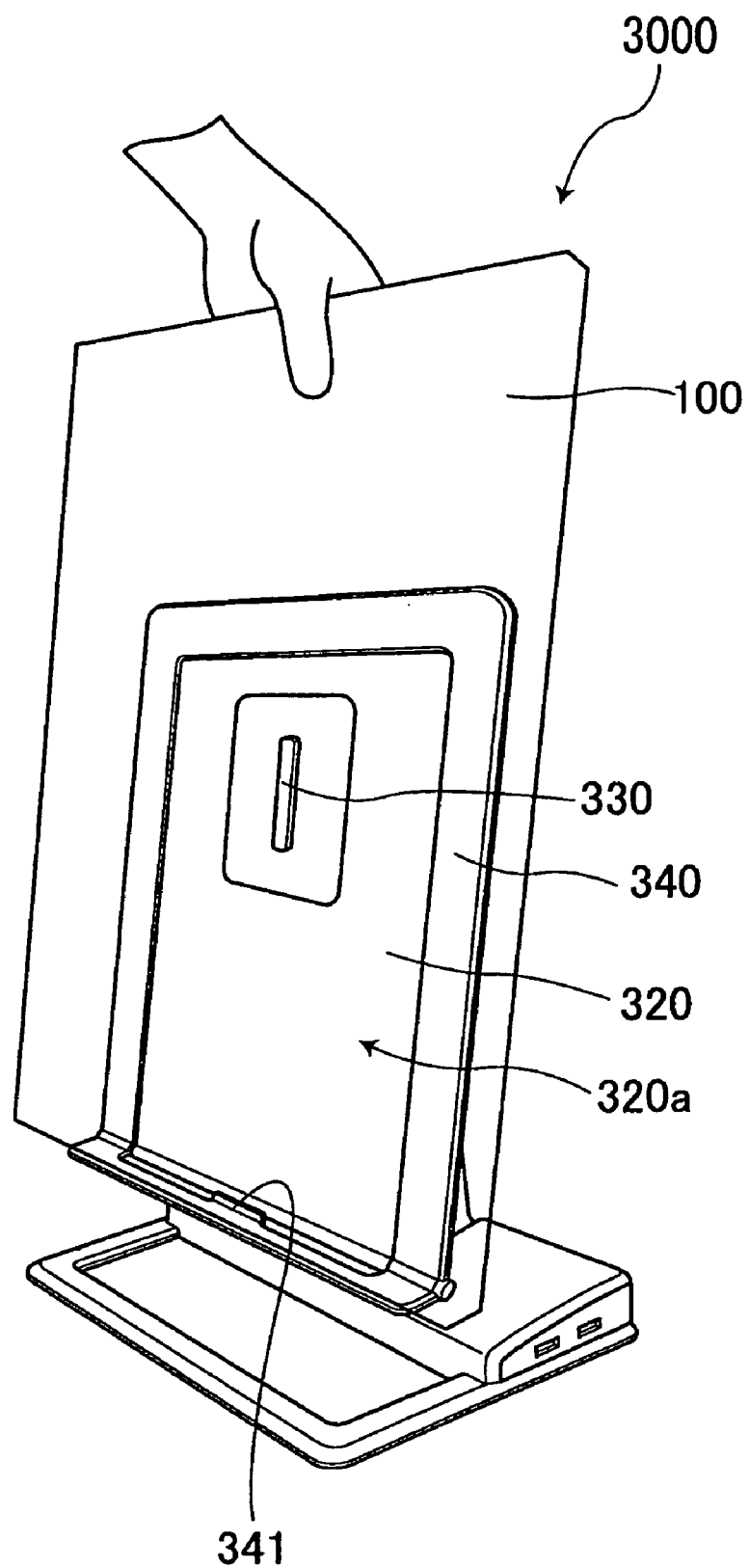
FIG. 22 is a perspective view of an electronic device system in the attached state.

FIG. 20 is a perspective view where the detached state is depicted. FIG. 21 is a perspective view illustrating a state of shifting from the detached state to the attached state. FIG. 22 is a perspective view of an electronic device system 3000 in the attached state.

As seen from FIG. 20 to FIG. 22, the guide material 340 comes in contact with both a part of the bottom and a part of the back 115 of the tablet PC 100 when the tablet PC 100 is attached and detached, and turns together with the tablet PC 100. The guide material 340 guides the pivoting movement of the tablet PC 100 between the attached state and the detached state. In the attached state, the back 115 of the tablet PC 100 is in contact with the surface 320a of the support board 320 and the docking station connection connector 1151 of the back 115 of the tablet PC 100 is connected with the joint section 330. In the detached state, the back 115 of the tablet PC 100 leaves the surface 320a of the support board 320 and the docking station connection connector 1151 of the back 115 of the tablet PC 100 leaves the joint section 330.

Therefore, the tablet PC 100 is reliably positioned with respect to the guide material 340.

The guide material 340 is formed to surround the support board 320. Therefore, the guide material 340 has a large area which comes in contact with the back 115 of the tablet PC 100, and thus it is possible to stably guide the turning of the tablet PC 100.

Figure 23:
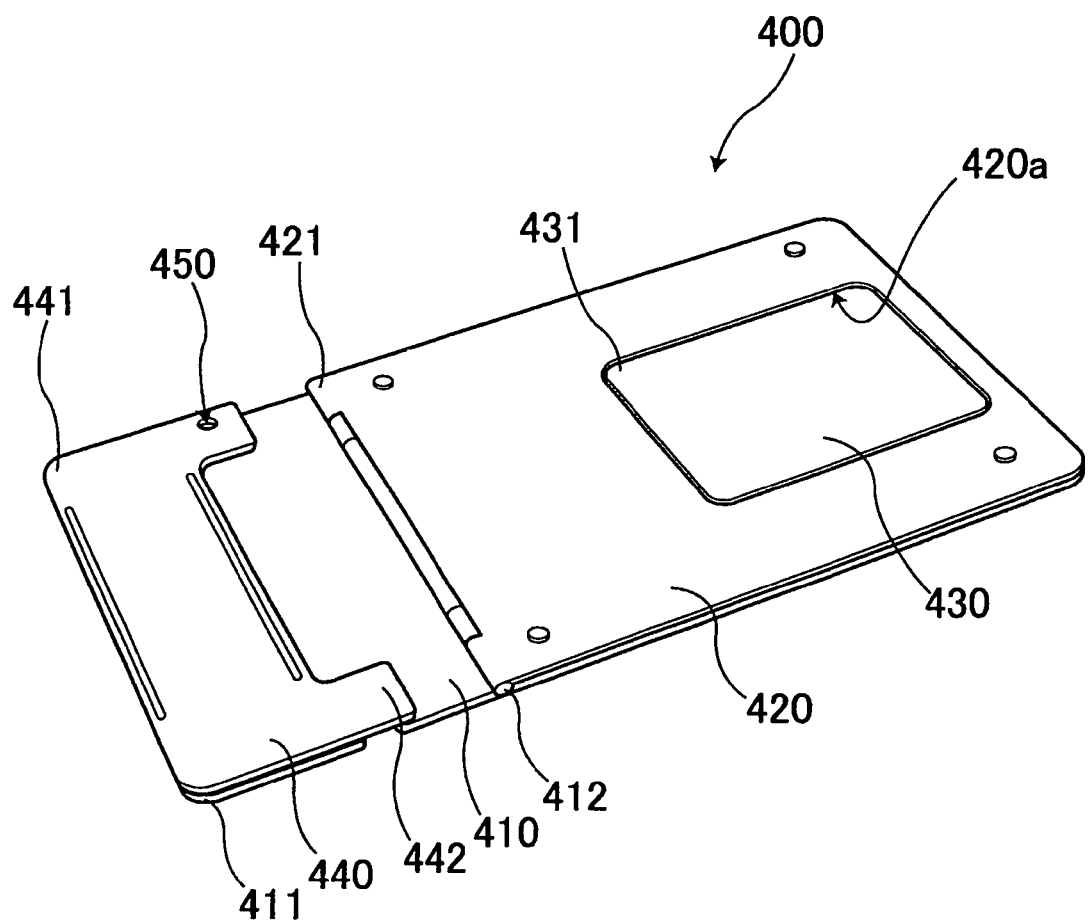
FIG. 23 is a perspective view of a stand in a folded state when viewed obliquely from the front.
Figure 24:
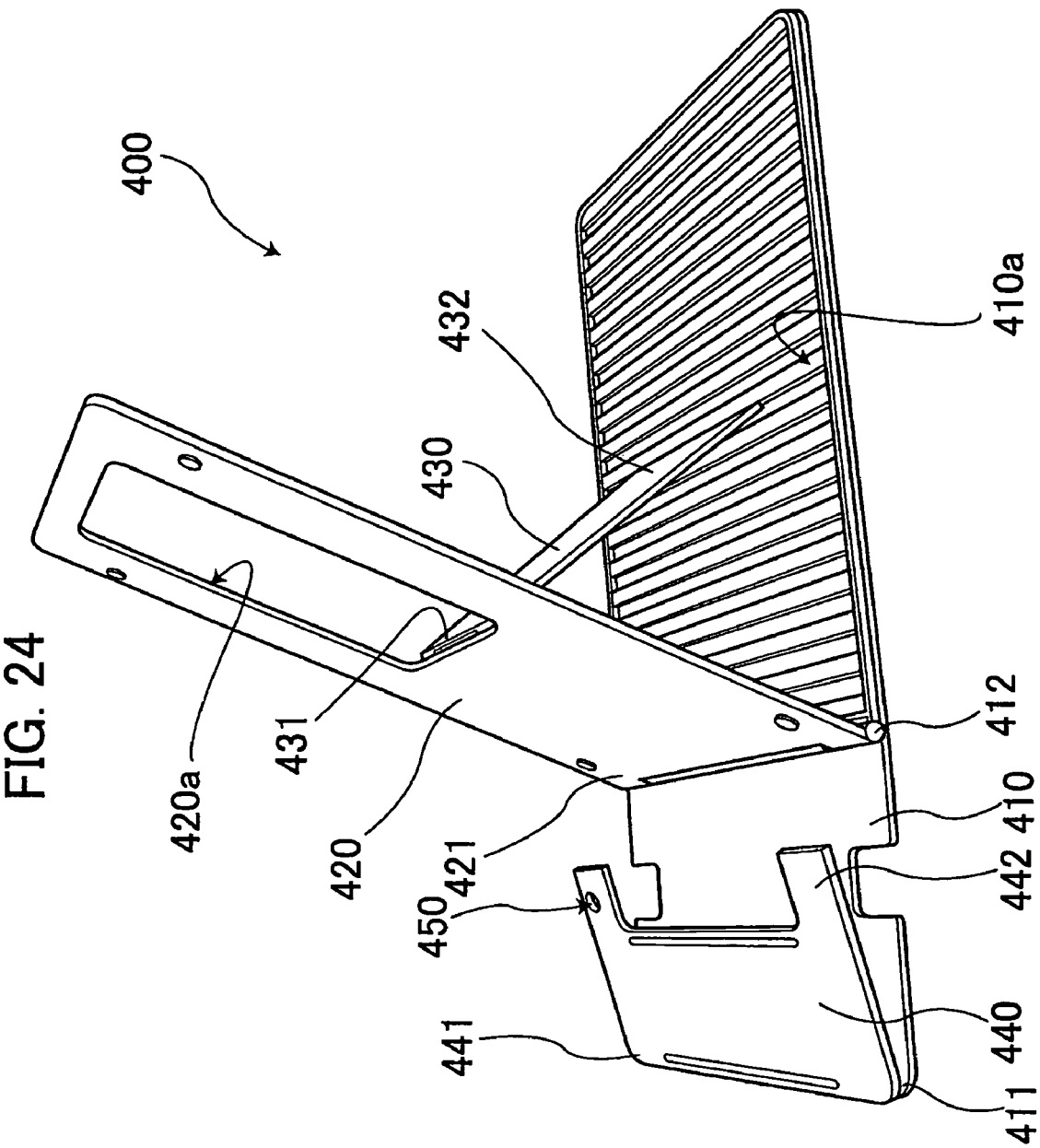
FIG. 24 is a perspective view of the stand in an unfolded state when viewed obliquely from the front.

FIG. 23 is a perspective view of a stand 400 in a folded state when viewed obliquely from the front. FIG. 24 is a perspective view of the stand 400 in an unfolded state when viewed obliquely from the front.

The stand 400 depicted in FIG. 23 and FIG. 24 is a simple stand on which the tablet PC 100 described referring to FIG. 1 to FIG. 7 is leant.

As seen from FIG. 23 and FIG. 24, the stand 400 has a base board 410, a back support board 420, a support interposition board 430, and a front support board 440.

The base board 410 is placed on the desk etc. for instance. As for the stand 400, the base board 410 has a convexo-concave shapes extended in the right and left and repeated back and forth, and accepts a rear end edge 432 of the support interposition board 430 described later in a concave part 410a of the convexo-concave shapes.

As for the back support board 420, a former edge 421 of the back support board 420 is pivotably supported on the base board 410 around a turning shaft 412 extending right and left at the position that goes from a former edge 411 of the base board 410 backward. The back support board 420 is pivotable between a flat state in which the back support board 420 is piled up on the base board 410 as a flat board, and two or more standing states in which the back support board 420 stands diagonally from the base board 410, and supports the back 115 of the tablet PC 100 in the standing states. The back support board 420 has an aperture 420a in which a support interposition board 430 described later in the flat state is to fit.

Therefore, when the stand 400 is folded, bulkiness is suppressed, and thus the stand 400 can be carried in a compact form.

As for the support interposition board 430, the former edge 431 of the support interposition board 430 is pivotably supported on the back support board 420 when the back support board 420 is in the flat state. The support interposition board 430 has a geometry that enables the support interposition board 430 to fit in the aperture 420a formed on the back support board 420. The support interposition board 430 is piled up as a flat board together with the back support board 420 and the base board 410 when the back support board 420 is in the flat state. As for the support interposition board 430, when the back support board 420 is in the standing states, the support interposition board 430 is pivotable to make the rear end edge 432 of the support interposition board 430 come in contact with the concave part 410a of convexo-concave shapes formed on the base board 410, so that the support interposition board 430 lies between the back support board 420 and the base board 410, and supports the back support board 420 in the standing states.

Accordingly, the back support board 420 can be supported at a desired standing angle by adjusting the standing angle of the back support board 420, by selecting the desired concave part 410a of the above-mentioned convexo-concave shapes and making the selected concave part 410a to come in contact with the rear end edge 432 of the support interposition board 430. Therefore, the display screen 120 of the tablet PC 100 to be leant is stood up at an easy-to-see angle, and the input operation with the special pen 130 can be carried out on the display screen 120 at this angle, which is convenient.

The front support board 440 is arranged between the former edge 411 of the base board 410 and the former edge 421 of the back support board 420. The front support board 440 is pivotable between a flat state and a standing state. In the flat state, the former edge 441 of the front support board 440 is pivotably supported by the base board 410 along the former edge 411 of the base board 410, and the front support board 440 is piled up on the base board 410 as a flat board. In standing state, the front support board 440 is made to stand at a prescribed angle after raised from the base board 410, and the rear end edge 442 of the front support board 440 comes in contact with the lower side of the front side of the tablet PC 100 that resides in the state that the back 115 is supported by the back support board 420 that exists in the standing state, so as to support the lower side of the front side of tablet PC 100. The front support board 440 is provided with an unloaded hole 450 for fixing the stand 400 under a keyboard 500 which will be described later.

According to such stand 400, the base board 410, the back support board 420, the support interposition board 430, and the front support board 440, which are the components of the stand, may be piled up on the base board as a flat plate when the stand is folded, thereby suppressing bulkiness, which realizes excellent portability.

Figure 25:
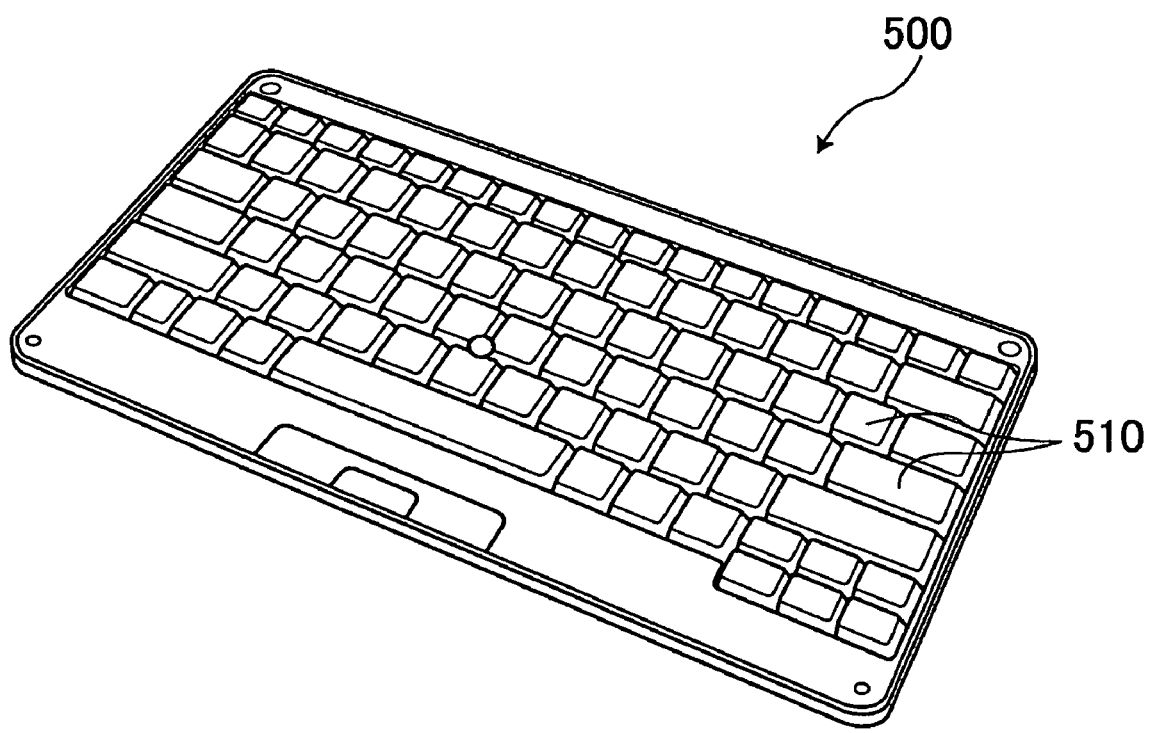
FIG. 25 is a perspective view of a keyboard when viewed obliquely from the upper front.

FIG. 25 is a perspective view of a keyboard 500 when viewed obliquely from the upper front.

The keyboard 500 depicted in FIG. 25 is a wireless keyboard in which operation keys 510 are arranged on the top, and key input information according to the key operation is wirelessly transmitted to the tablet PC 100.

Figure 26:
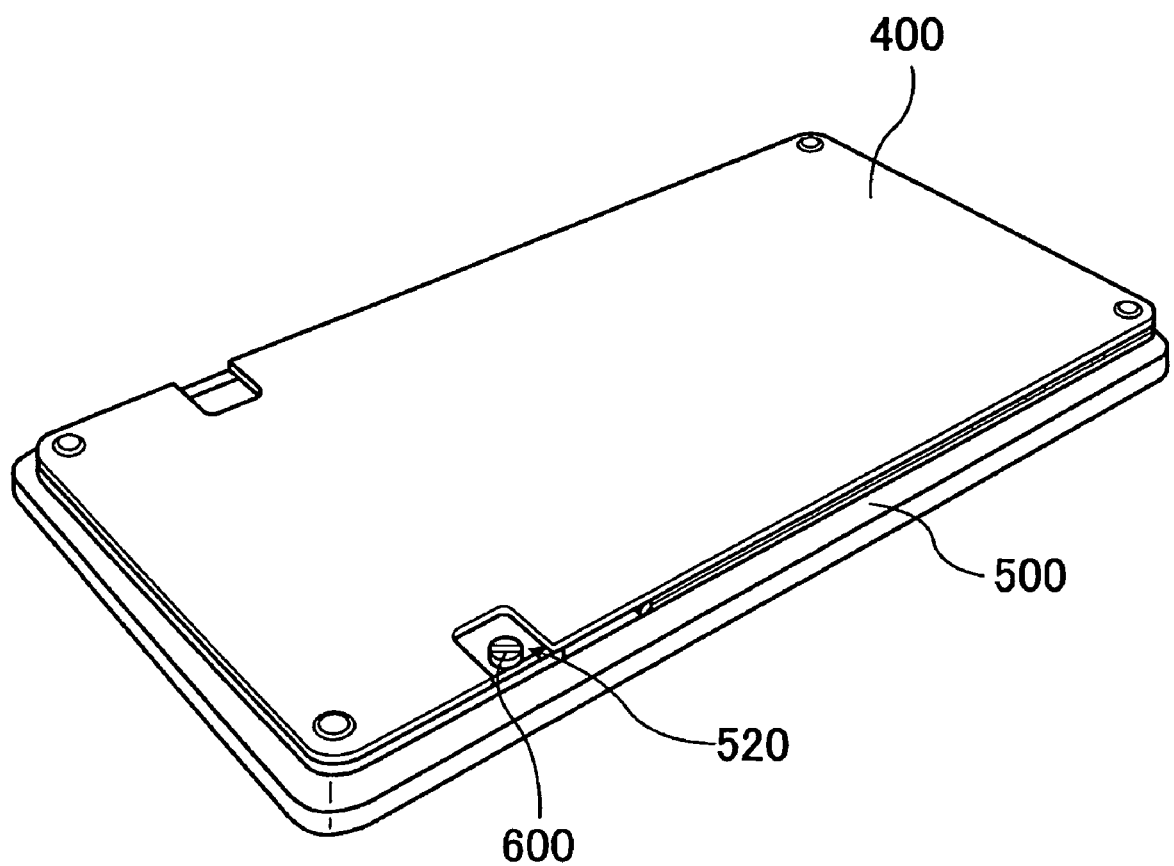
FIG. 26 is a perspective view of the stand fixed with a screw under the keyboard depicted in FIG. 25 when viewed obliquely from the upper back.

FIG. 26 is a perspective view of the stand 400 fixed with a screw 600 under the keyboard 500 depicted in FIG. 25 when viewed obliquely from the upper back.

As seen from FIG. 26, the keyboard 500 is provided with a screw hole 520 in the back. Moreover, the stand 400 described referring to FIG. 23 and FIG. 24 can be fixed under the keyboard 500 with the screw 600 by using the screw hole 520 of the keyboard 500.

Therefore, even in a case where the stand 400 is carried with the keyboard 500, bulkiness is suppressed, and high portability is secured.

Figure 27:
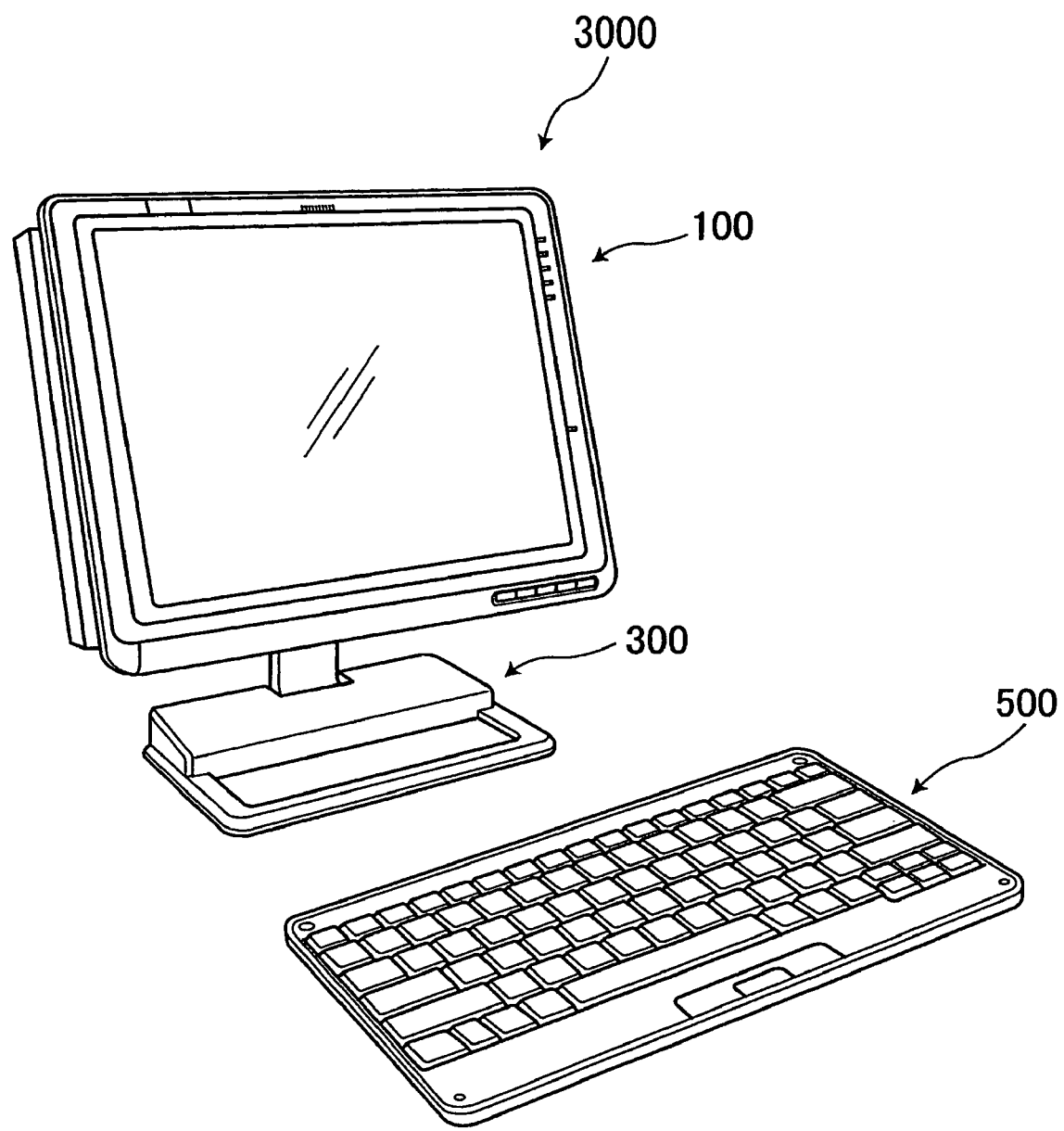
FIG. 27 is a perspective view of the keyboard depicted in FIG. 26 with the electronic device system in which the tablet PC is attached to the docking station, when viewed obliquely from the upper front.

FIG. 27 is a perspective view of the keyboard 500 depicted in FIG. 26 with the electronic device system 3000 in which the tablet PC 100 is attached to the docking station 300, when viewed obliquely from the upper front.

According to the use form where the electronic device system 3000 in which the tablet PC 100 is attached to the docking station 300 described referring to FIG. 14 to FIG. 22 is used with the keyboard 500 under which the stand 400 is fixed, bulkiness is suppressed, as mentioned above, even if the stand 400 is stored under the keyboard 500. Thus, the user can operate the keyboard 500 in which the stand 400 is accommodated, without having an uncomfortable feeling.

Figure 28:
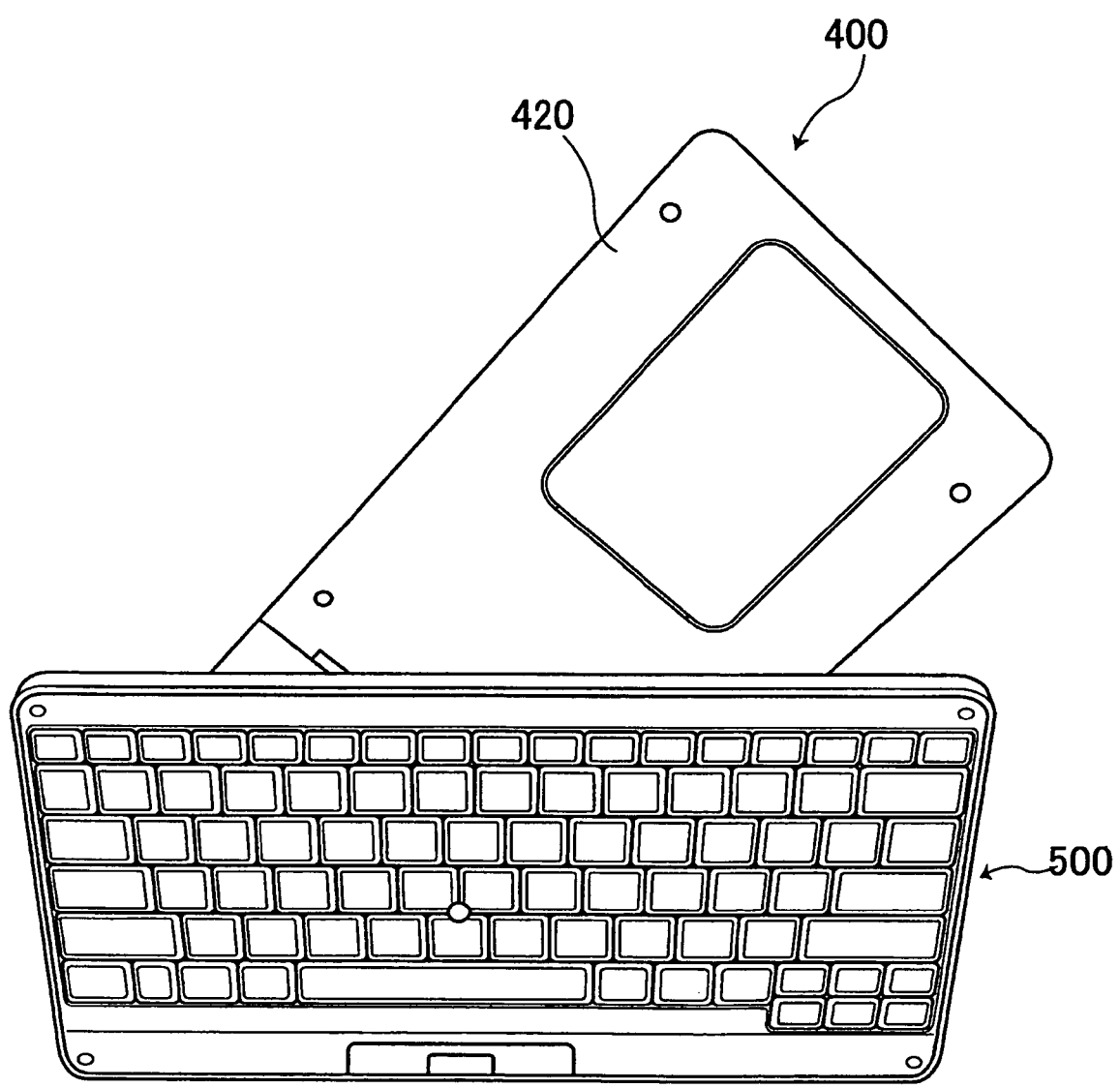
FIG. 28 is a perspective view illustrating the state of the process of taking out the back support board of the stand depicted in FIG. 26 from under the keyboard, when viewed obliquely from the upper front.
Figure 29:
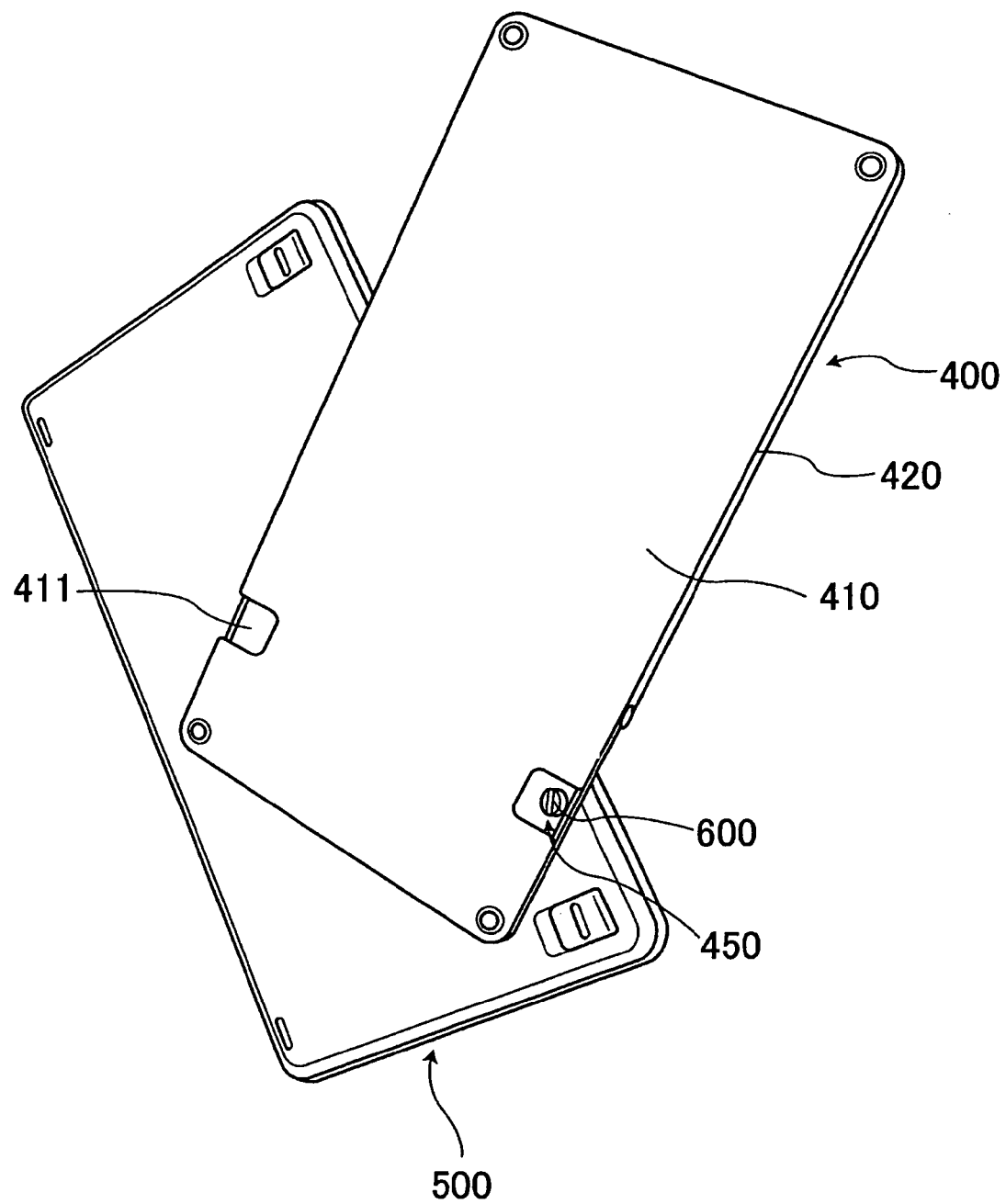
FIG. 29 is a perspective view where the state depicted in FIG. 28 is viewed obliquely from the upper back.
Figure 30:
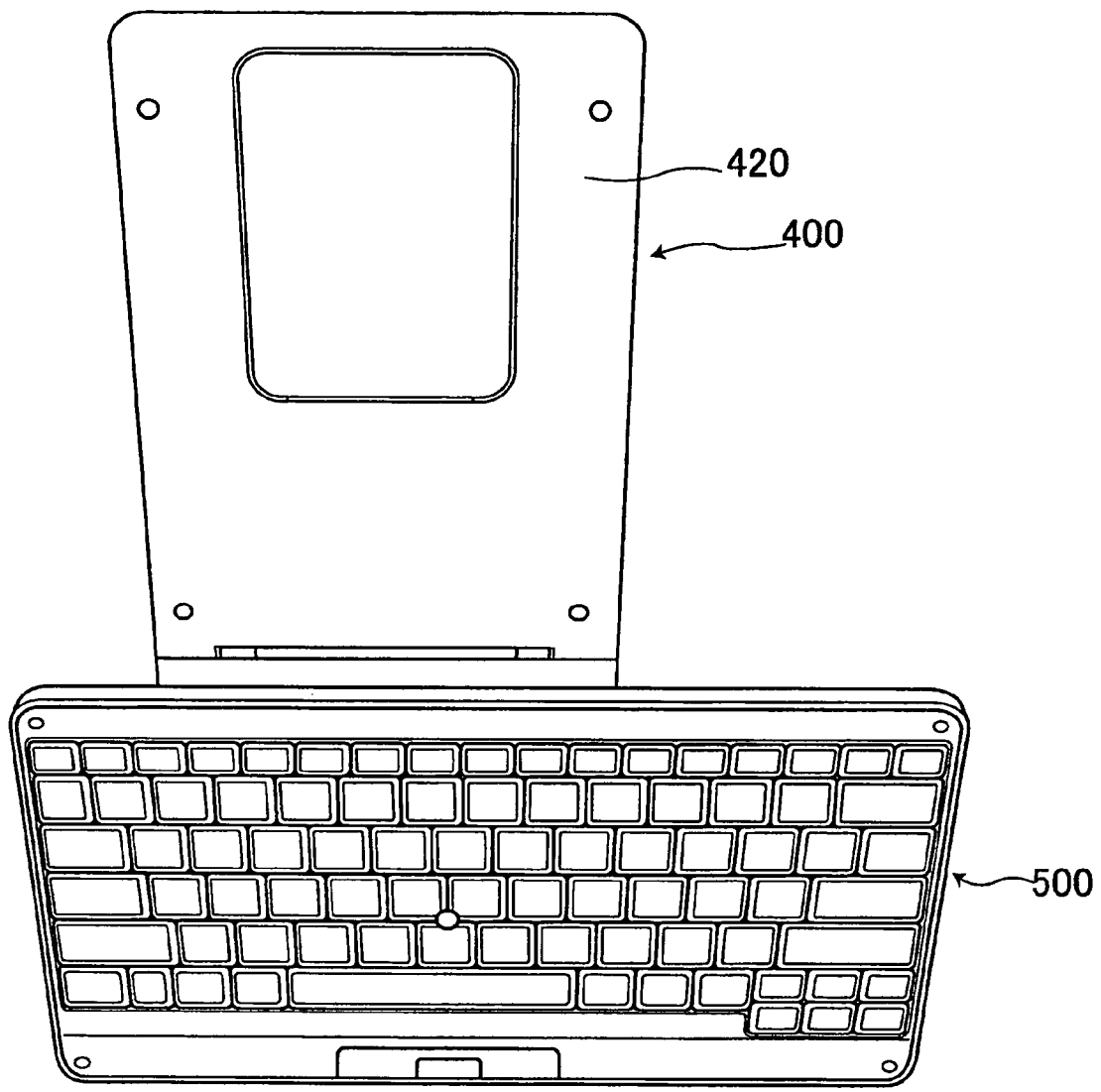
FIG. 30 is a perspective view where a use state in which the back support board of the stand depicted in FIG. 26 is taken out from under the keyboard is viewed obliquely from the upper front.
Figure 31:
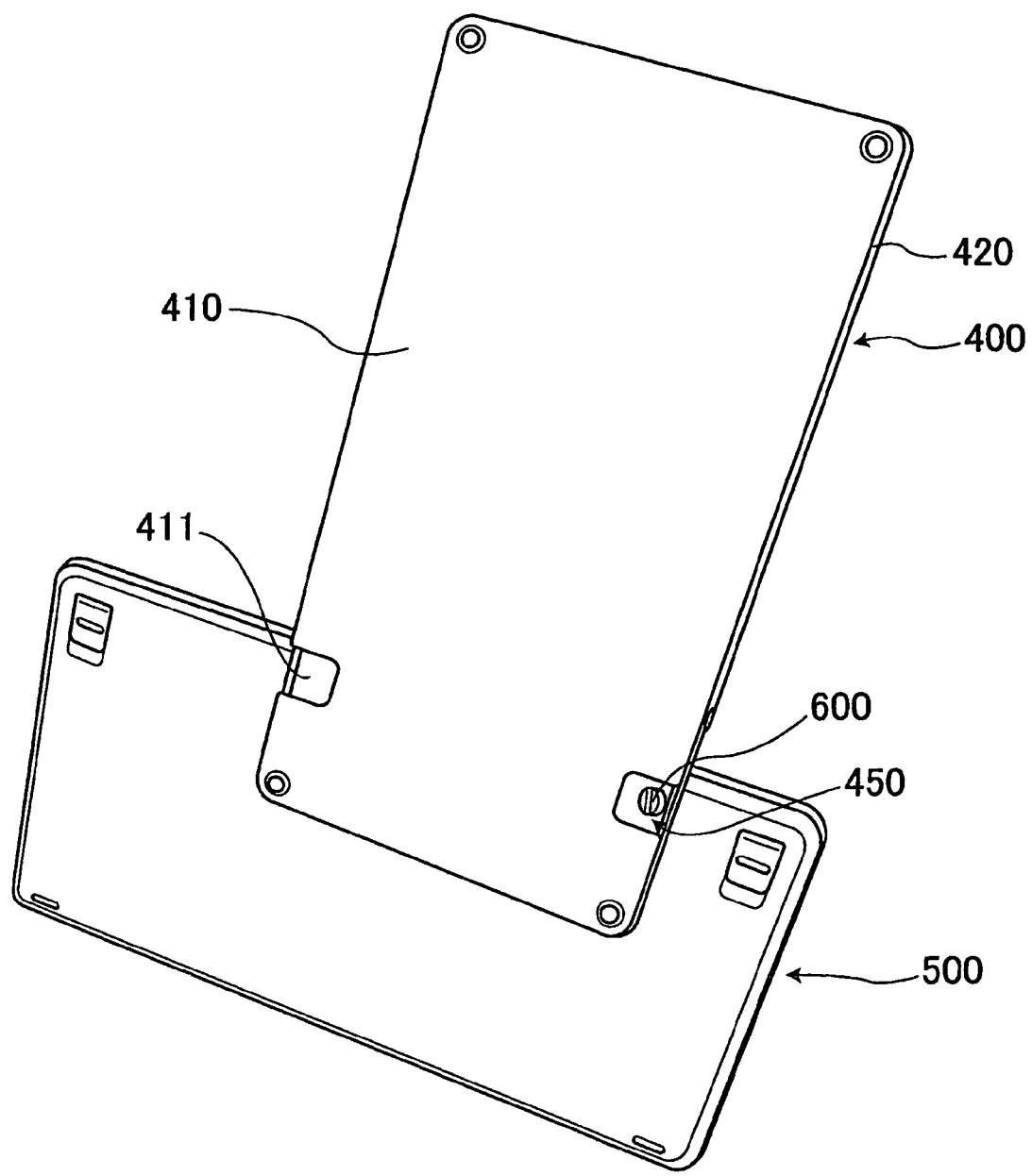
FIG. 31 is a perspective view where the use state depicted in FIG. 30 is viewed obliquely from the upper back.
Figure 32:
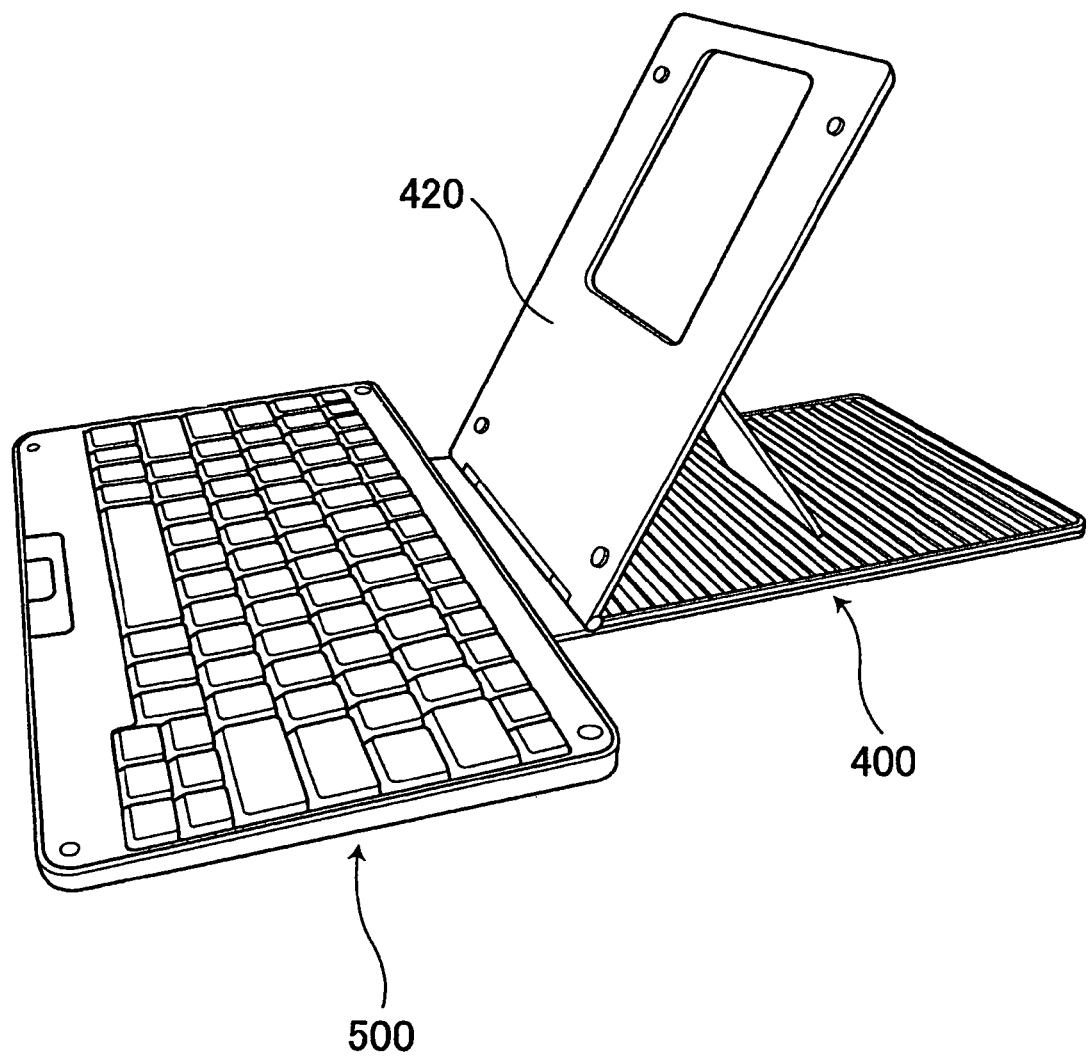
FIG. 32 is a perspective view where the state that the back support board is supported in the standing state in the use state depicted in FIG. 30 is viewed obliquely from the upper front.

FIG. 28 is a perspective view illustrating the state of the process of taking out the back support board 420 of the stand 400 depicted in FIG. 26 from under the keyboard 500, when viewed obliquely from the upper front. FIG. 29 is a perspective view where the state depicted in FIG. 28 is viewed obliquely from the upper back. FIG. 30 is a perspective view where a use state in which the back support board 420 of the stand 400 depicted in FIG. 26 is taken out from under the keyboard 500 is viewed obliquely from the upper front. FIG. 31 is a perspective view where the use state depicted in FIG. 30 is viewed obliquely from the upper back. FIG. 32 is a perspective view where the state that the back support board 420 is supported in the standing state in the use state depicted in FIG. 30 is viewed obliquely from the upper front.

As seen from FIG. 28 to FIG. 32, the stand 400 has the unloaded hole 450 that permits the stand 400 to be pivotable, with a screw 600 loosened, between a storage state that the stand 400 is stored under the keyboard 500, and a use state that the former edge 411 of the base board 410 remains under the keyboard 500 and the back support board 420 is taken out from under the keyboard 500.

Figure 33:
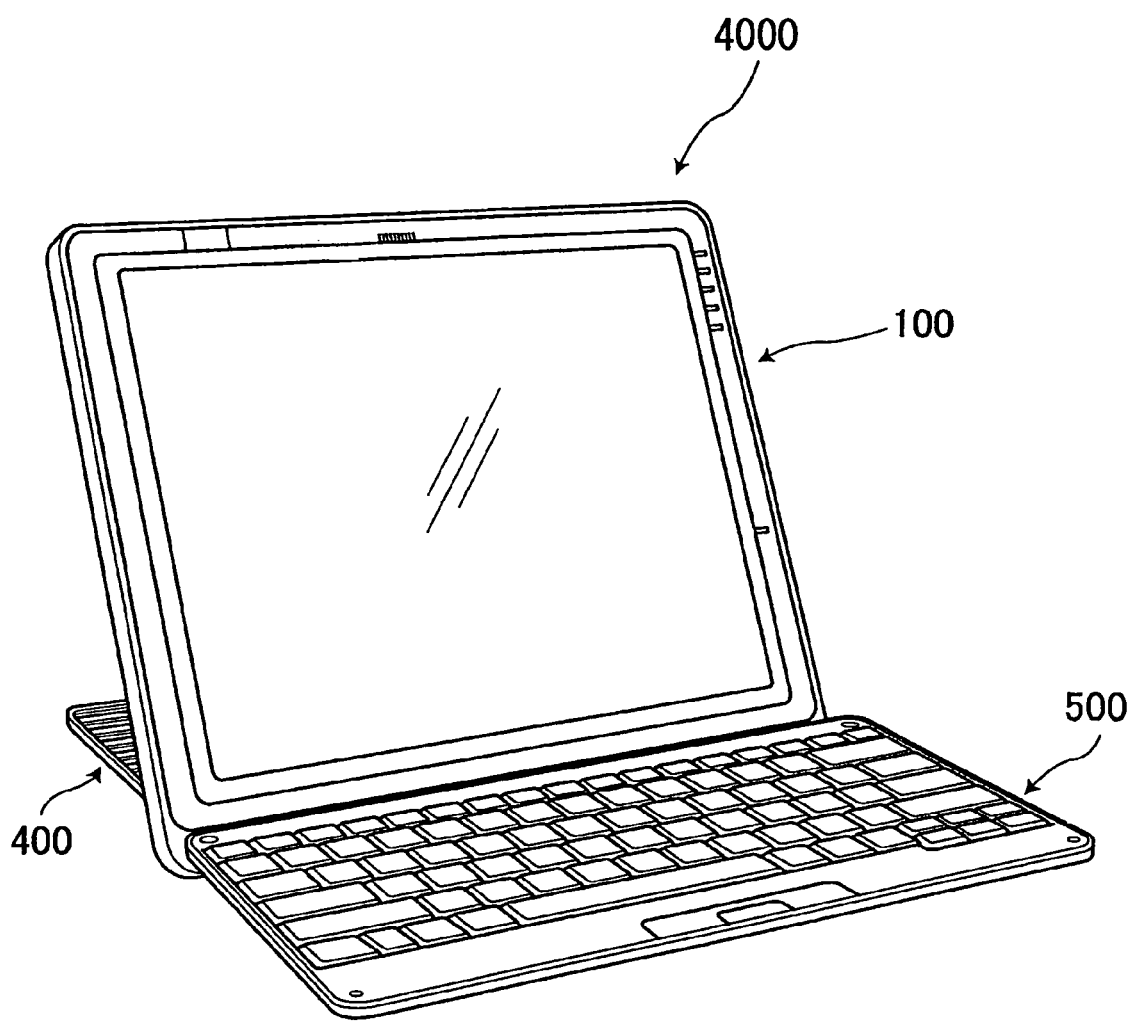
FIG. 33 is a perspective view where the electronic device system in which the tablet PC leaning on the stand depicted in FIG. 32 is viewed obliquely from the upper front.

FIG. 33 is a perspective view where the electronic device system 4000 in which the tablet PC 100 leaning on the stand 400 depicted in FIG. 32 is viewed obliquely from the upper front.

The stand 400, which is fixed with the screw 600 under the keyboard 500, has the unloaded hole 450 that permits the stand 400 to be pivotable, with the screw 600 loosened, between the storage state and the use state. This feature makes it possible to easily take out the back support board 420 of the stand 400 from under the keyboard 500, if necessary. Thus it is convenient. Moreover, when the back support board 420 of the stand 400 taken out from under the keyboard 500 is supported in the standing state so that the tablet PC 100 leans against the stand 400, the rear end edge of the keyboard 500 comes in contact with the lower portion of the front side of tablet PC 100 in the leaning state so as to support the lower portion of the front side of the tablet PC 100. This feature makes it possible to use the tablet PC 100 in the form like the notebook type personal computer. In addition, the back support board 420 of the stand 400 is taken out from under the keyboard 500 if necessary, and is set in the standing state, so that the tablet PC 100 is leant against the stand 400. This feature makes it possible to permit a key input without connecting the keyboard 500 to the tablet PC 100 with a cable. Thus it is convenient.

Although the tablet PC has been described so far as one example of the electronic device according to the embodiments mentioned above, the present invention is not restricted to the embodiments, and can be applied even to a palm-size type of electronic device whose processing performance is limited.

In the above embodiments, there has been described the detection section that detects both scroll information according to sliding operation by a finger of an operator and scroll information according to sliding operation with a pen by an operator. But the detection section is not restricted to the embodiments, and anything is acceptable, as the detection section, as long as scroll information according to sliding operation by an operator can be detected.

In the above embodiments, there has been described, by way of example, the detection section that is disposed on both a part where a groove of the groove section is extended in a vertical direction and a part where a groove is extended in a horizontal direction, and disposed near at least one of four corners of the display screen. But the detection section is not restricted to the embodiments, and anything is acceptable, as the detection section, as long as the detection section is disposed in the groove section.

In the above embodiments, there has been described the example in which the support interposition board of the stand is pivotably supported on the back support board. But the support interposition board is not restricted to the embodiments, and anything is acceptable, as the support interposition board, as long as the support interposition board is pivotably supported on at least one of the back support board and the base board.

In the above embodiments, there has been described, by way of example, the base board of the stand, which has the convexo-concave shapes extended in the right and left and repeated back and forth, in which the rear end edge of the support interposition board is accepted in the concave portion of the convexo-concave shape. But the base board is not restricted to the embodiments, and anything is acceptable, as the base board, as long as the base board has two or more support parts each supporting the rear end edge of the support interposition board back and forth.

In the above embodiments, there has been described the example in which as for the stand, the back support board has an aperture, and the support interposition board has a geometry to be engaged in the aperture in the flat state. But the stand is not restricted to the embodiments, and anything is acceptable, as the stand, as long as the stand has a geometry to be a flat board so that both the back support board and the support interposition board, which exist in the flat state, are arranged directly on the base board, while avoiding overlapping the back support board and the support interposition board with each other.

In the above embodiments, there has been described the example in which the keyboard is a wireless keyboard. But the keyboard is not restricted to the embodiments, and anything is acceptable as the keyboard.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A stand against which an electronic device having a front face with a display screen disposed thereon is leaned, the stand comprising: a base board to be laid; a back support board having a former edge that is pivotably supported on the base board around a turning shaft extending right and left at a position that goes from the former edge of the base board backward, the back support board being pivotable between a flat state in which the back support board lies flat on the base board and at least one of standing states in which the back support board stands diagonally on the base board, and supporting a back of the electronic device in the standing state; a support interposition board that is pivotably supported on one of the back support board and the base board, and lies flat together with the back support board and the base board when the back support board is in the flat state, the support interposition board being pivotable when the back support board is in the standing states, so that the support interposition board is interposed between the back support board and the base board and allows the back support board to be supported on the base board in the standing states; and a front support board that is arranged between the former edge of the base board and a former edge of the back support board, the front support board being pivotable between a flat state in which the former edge of the front support board is pivotably supported by the base board along the former edge of the base board, and the front support board lies flat on the base board, and a standing state in which the front support board stands at a prescribed angle on the base board and a rear end edge of the front support board abuts and supports a lower front part of the electronic device whose back is supported by the back support board in the standing state; wherein the stand is fixed under a keyboard having a front face where operation keys are arranged, the keyboard having a screw hole in a back face, with a screw using the screw hole of the keyboard, and the stand has an unloaded hole that permits the stand to be pivotable with the screw loosened between a storage state that the stand is stored under the keyboard, and a use state that the former edge of the base board remains under the keyboard and the back support board is taken out from under the keyboard.

2. The stand according to claim 1, wherein as for the support interposition board, the former edge of the support interposition board is pivotably supported on the back support board when the back support board is in the flat state, and as for the support interposition board, when the back support board is in a standing state, the support interposition board makes a rear end edge of the support interposition board abut the base board, and
   the base board has two or more support parts each supporting the rear end edge of the support interposition board and disposed in a front and back direction.

3. The stand according to claim 2, wherein the base board has convexo-concave shapes extended in a right and left direction and repeated in a front and back direction, and accepts a rear end edge of the support interposition board in a concave part of the convexo-concave shapes.

4. The stand according to claim 1, wherein the stand has a geometry that allows both the back support board and the support interposition board to directly lie flat on the base board, while avoiding overlapping the back support board and the support interposition board with each other.

5. The stand according to claim 4, wherein the back support board has an aperture, and the support interposition board has a geometry that enables the support interposition board in the flat state to fit in the aperture.

6. The stand according to claim 1, wherein the display screen disposed on the front face of the electronic device has a pen input function of detecting contact or approach of a pen, and
   the electronic device, which is provided with the display screen having the pen input function, is leant against the stand.

7. The stand according to claim 1, wherein the keyboard is a wireless keyboard in which key input information according to a key operation is wirelessly transmitted to the electronic device, and the stand is fixed with the screw under the wireless keyboard, and the stand has the unloaded hole that permits the stand to be pivotable with the screw loosened between the storage state and the use state.

8. An electronic device system comprising: an electronic device having a front face with a display screen disposed thereon; and a stand against which the electronic device is leaned, wherein the stand comprises: a base board to be laid, a back support board having a former edge that is pivotably supported on the base board around a turning shaft extending right and left at a position that goes from the former edge of the base board backward, the back support board being pivotable between a flat state in which the back support board lies flat on the base board and at least one of standing states in which the back support board stands diagonally on the base board, and supporting a back of the electronic device in the standing state, a support interposition board that is pivotably supported on one of the back support board and the base board, and lies flat together with the back support board and the base board when the back support board is in the flat state, the support interposition board being pivotable when the back support board is in the standing states, so that the support interposition board is interposed between the back support board and the base board and allows the back support board to be supported on the base board in the standing states, and a front support board that is arranged between the former edge of the base board and a former edge of the back support board, the front support board being pivotable between a flat state in which the former edge of the front support board is pivotably supported by the base board along the former edge of the base board, and the front support board lies flat on the base board, and a standing state in which the front support board stands at a prescribed angle on the base board and a rear end edge of the front support board abuts and supports a lower front part of the electronic device whose back is supported by the back support board in the standing state; wherein the stand is fixed under a keyboard having a front face where operation keys are arranged, the keyboard having a screw hole in a back face, with a screw using the screw hole of the keyboard, and the stand has an unloaded hole that permits the stand to be pivotable with the screw loosened between a storage state that the stand is stored under the keyboard, and a use state that the former edge of the base board remains under the keyboard and the back support board is taken out from under the keyboard.

* * * * *